(12) United States Patent
Katsuhara et al.

(10) Patent No.: US 11,885,695 B2
(45) Date of Patent: Jan. 30, 2024

(54) SENSOR, STACK-TYPE SENSOR, AND ELECTRONIC DEVICE

(71) Applicant: Sony Corporation, Tokyo (JP)

(72) Inventors: Tomoko Katsuhara, Tokyo (JP); Yoshiaki Sakakura, Tokyo (JP); Manami Miyawaki, Tokyo (JP)

(73) Assignee: Sony Corporation, Tokyo (JP)

( * ) Notice: Subject to any disclaimer, the term of this patent is extended or adjusted under 35 U.S.C. 154(b) by 313 days.

(21) Appl. No.: 17/277,431

(22) PCT Filed: Oct. 3, 2019

(86) PCT No.: PCT/JP2019/039155
§ 371 (c)(1),
(2) Date: Mar. 18, 2021

(87) PCT Pub. No.: WO2020/080127
PCT Pub. Date: Apr. 23, 2020

(65) Prior Publication Data
US 2022/0034728 A1 Feb. 3, 2022

(30) Foreign Application Priority Data
Oct. 19, 2018 (JP) .................................. 2018-197381

(51) Int. Cl.
*G01L 1/14* (2006.01)
(52) U.S. Cl.
CPC .................................... *G01L 1/146* (2013.01)
(58) Field of Classification Search
CPC .......... G01L 1/146; G01L 5/165; G01L 5/228
See application file for complete search history.

(56) References Cited

U.S. PATENT DOCUMENTS 9,201,105 B2 * 12/2015 Iida ....................... G06F 3/0447
2005/0000298 A1 1/2005 Pfeifer et al.
2012/0222498 A1 9/2012 Mamigonians
(Continued)

FOREIGN PATENT DOCUMENTS

JP 2008-203055 A 9/2008
JP 2010-122018 6/2010
(Continued)

OTHER PUBLICATIONS

International Search Report issued in International Patent Application No. PCT/JP2019/039155 dated Nov. 12, 2019 and English translation of same. 5 pages.
(Continued)

*Primary Examiner* — Octavia Davis Hollington
(74) *Attorney, Agent, or Firm* — K&L Gates LLP

(57) ABSTRACT

A sensor includes a sensor electrode layer including a capacitive sensing unit, a first reference electrode layer provided to face a first surface of the sensor electrode layer, and a first elastic layer that is provided between the first reference electrode layer and the sensor electrode layer, and is configured to be elastically deformed by shear force added in an in-plane direction. At least one of the first reference electrode layer or the first elastic layer includes a first probe portion that is displaced in an in-plane direction in accordance with elastic deformation of the first elastic layer, and changes an electrostatic capacitance of the sensing unit.

20 Claims, 18 Drawing Sheets

(56) References Cited

U.S. PATENT DOCUMENTS

2016/0011708 A1    1/2016  Chung
2021/0208012 A1*  7/2021  Katsuhara ............... G01L 1/086

FOREIGN PATENT DOCUMENTS

| JP | 5417454 B2 * | 2/2014 | ............ G01L 1/142 |
| JP | 2016-146146 A | 8/2016 | |
| JP | 2018-115873 A | 7/2018 | |
| KR | 20160008302 A * | 1/2016 | |
| WO | WO2018051917 A1 | 3/2018 | |

OTHER PUBLICATIONS

Written Opinion issued in International Patent Application No. PCT/JP2019/039155 datedNov. 12, 2019. 5 pages.

* cited by examiner

FIG. 3
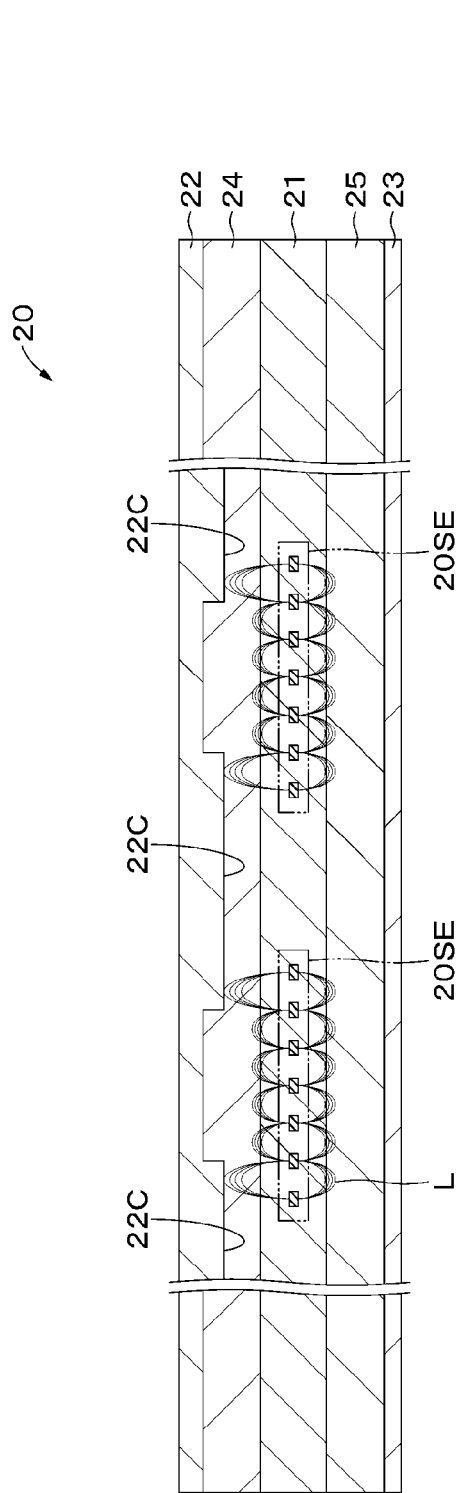
A
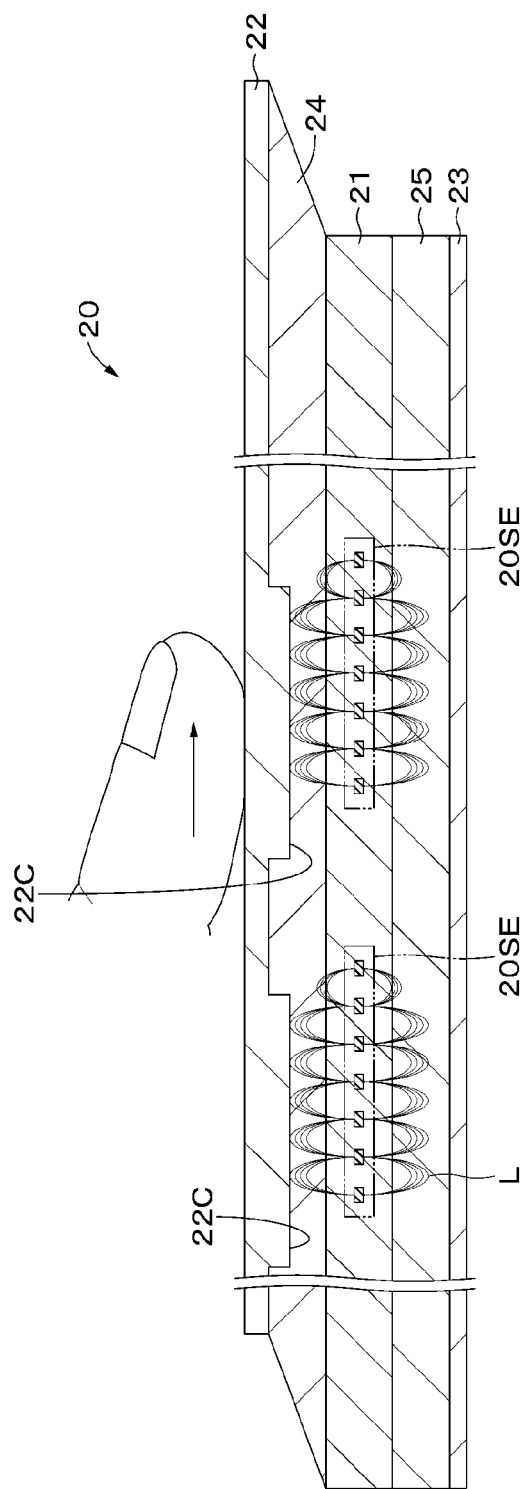
B

FIG. 6
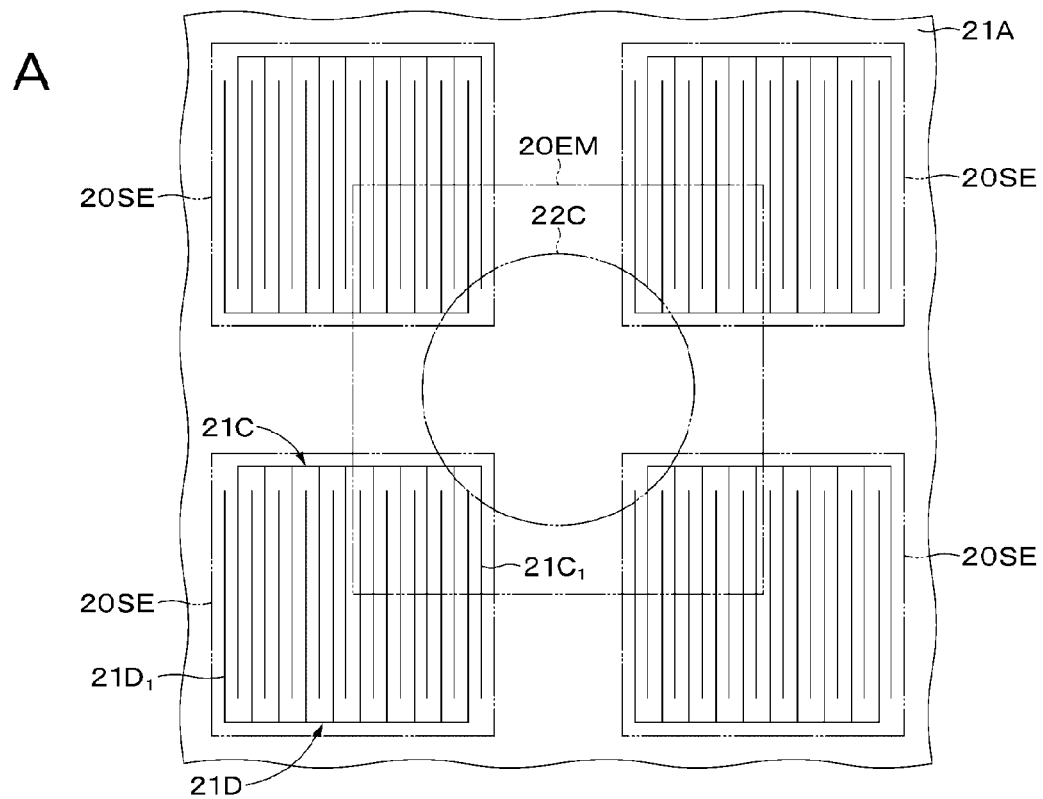
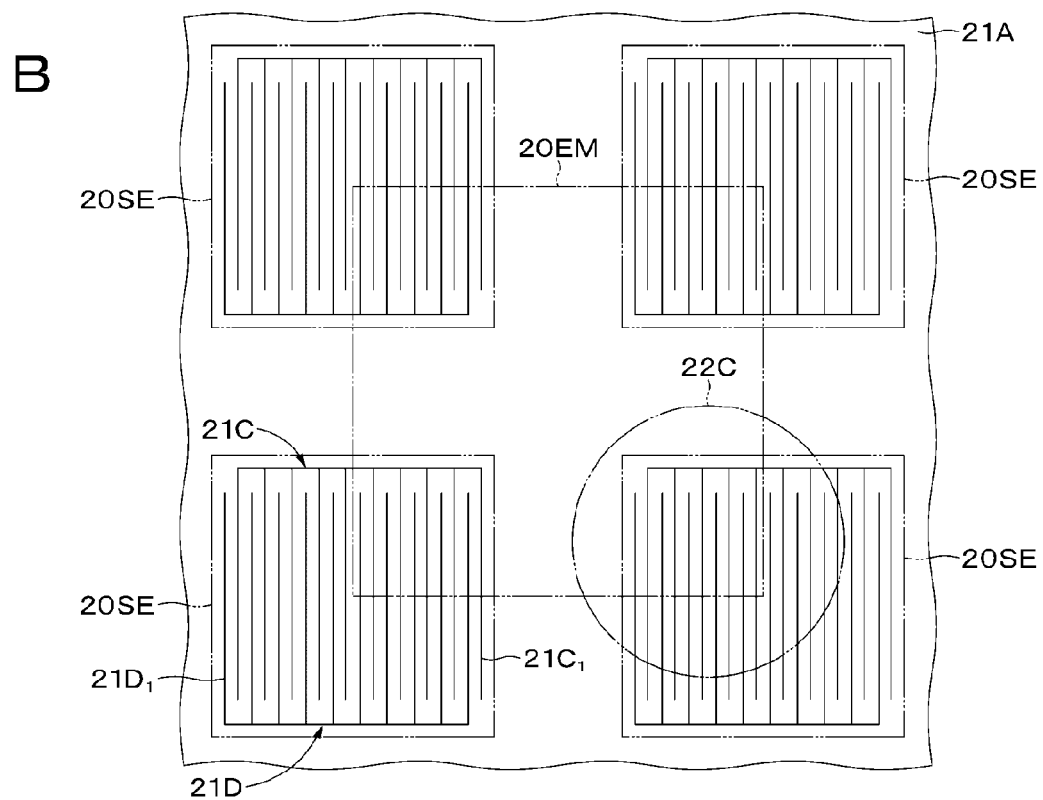

FIG. 7
A
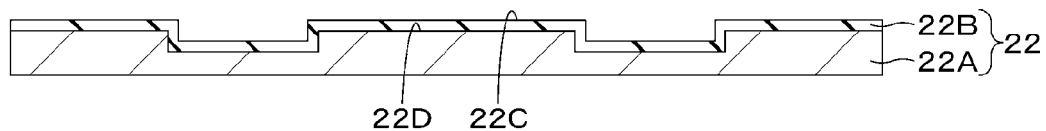
B
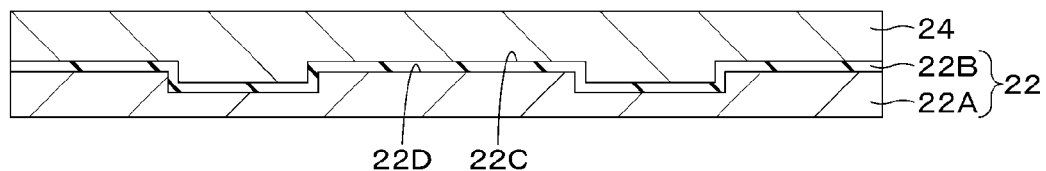
C
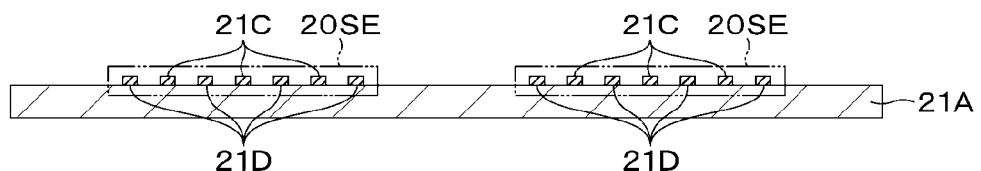
D
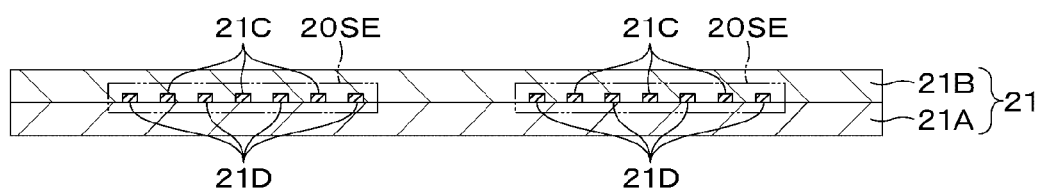
E
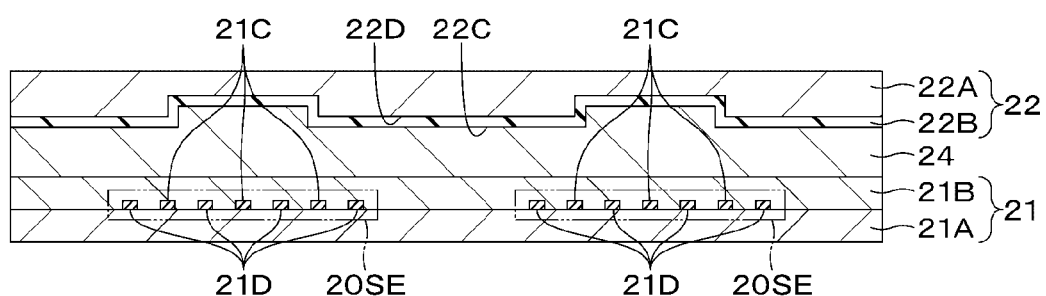

FIG. 11
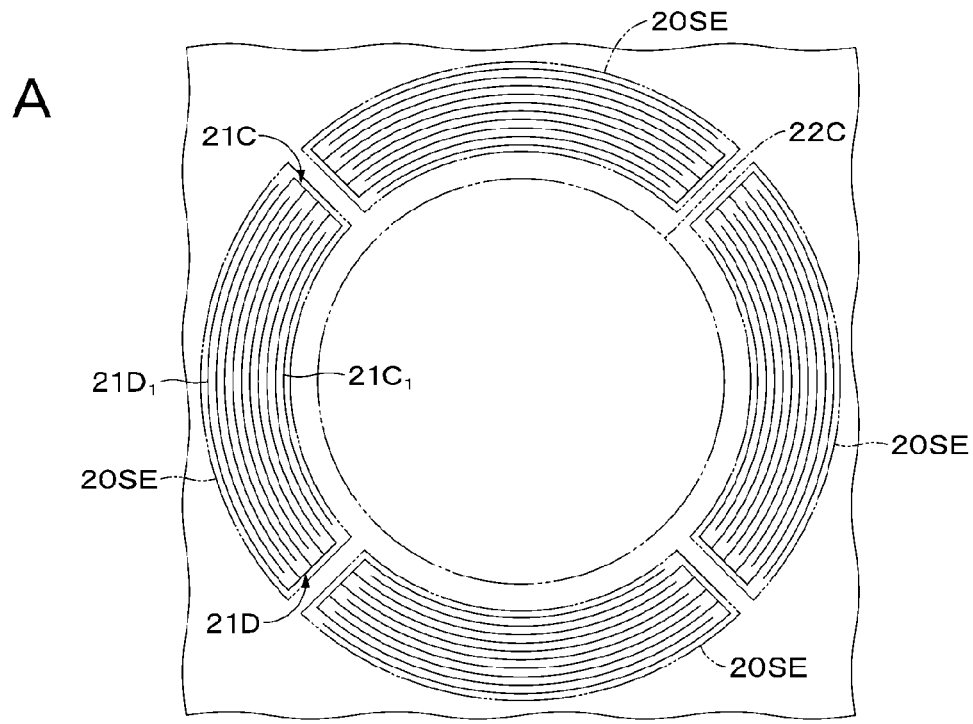
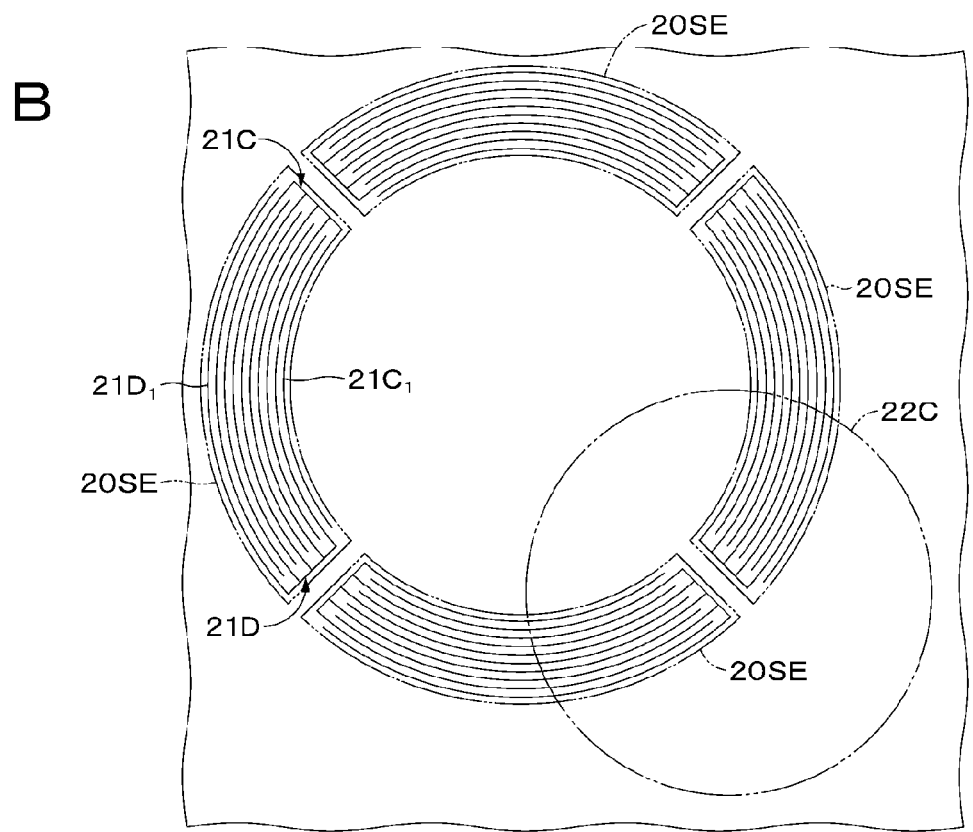

FIG. 15
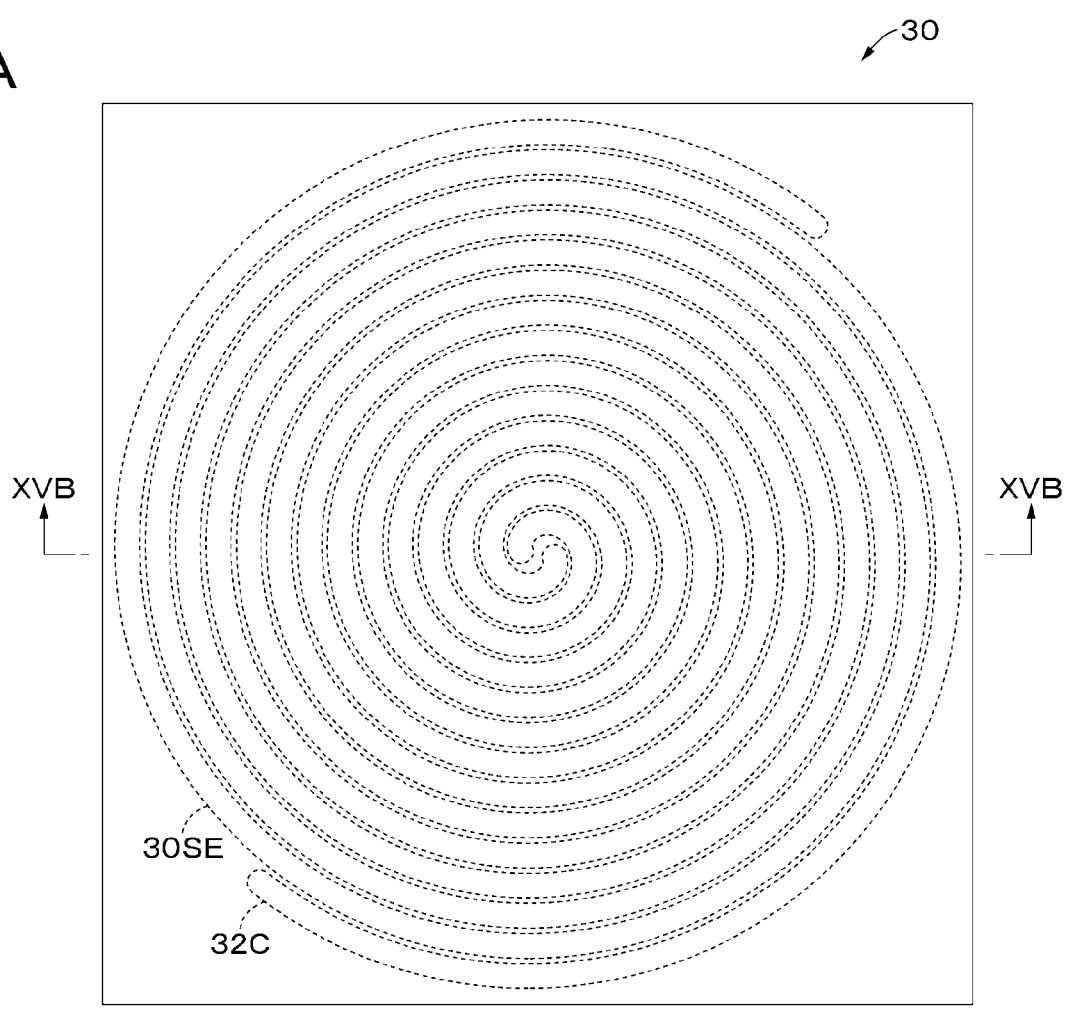
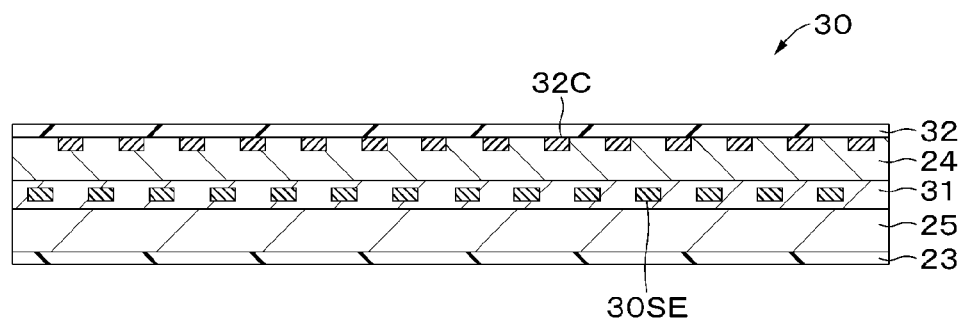

SENSOR, STACK-TYPE SENSOR, AND ELECTRONIC DEVICE

TECHNICAL FIELD

The present disclosure relates to a sensor, a stack-type sensor, and an electronic device.

BACKGROUND ART

In recent years, a sensor that can detect shear force has been demanded. Patent Document 1 describes a tactile sensor having a system of electrostatically detecting a change in effective electrode area between two electrodes that is caused by shear force.

Furthermore, Patent Document 1 describes that, in the tactile sensor, load input from a contact target object can be easily separated into compressive force and shear force.

CITATION LIST

Patent Document

Patent Document 1: Japanese Patent Application Laid-Open No. 2010-122018

SUMMARY OF THE INVENTION

Problems to be Solved by the Invention

As described above, in recent years, a sensor that can detect shear force has been demanded.

The object of the present disclosure is to provide a sensor, a stack-type sensor, and an electronic device that can detect shear force.

Solutions to Problems

For solving the above-described issues, a first disclosure is a sensor including a sensor electrode layer including a capacitive sensing unit, a first reference electrode layer provided to face a first surface of the sensor electrode layer, and a first elastic layer that is provided between the first reference electrode layer and the sensor electrode layer, and is configured to be elastically deformed by shear force added in an in-plane direction, in which at least one of the first reference electrode layer or the first elastic layer includes a first probe portion that is displaced in an in-plane direction in accordance with elastic deformation of the first elastic layer, and changes an electrostatic capacitance of the sensing unit.

A second disclosure is a stack-type sensor including a first sensor configured to detect a pressure, and a second sensor that is provided on the first sensor, and is configured to detect shear force, in which the second sensor is the sensor of the first disclosure.

A third disclosure is an electronic device including the sensor of the first disclosure.

Effects of the Invention

According to the present disclosure, shear force can be detected. Note that the effect described here is not necessarily limited, and may be any effect described in the present disclosure or an effect different from these.

BRIEF DESCRIPTION OF DRAWINGS

FIG. 3A is a cross-sectional view taken along a IIIA-IIIA line in FIG. 2. FIG. 3B is a cross-sectional view illustrating a state of a sensor when shear force is added in an in-plane direction.

FIG. 6A is a plan view illustrating a configuration of a sensor electrode layer. FIG. 6B is a plan view illustrating an example of a positional relationship between a sensing unit and a protruding portion when shear force is added in the in-plane direction.

FIGS. 7A, 7B, 7C, 7D, and 7E are process diagrams for describing a manufacturing method of a sensor.

FIG. 11A is a plan view illustrating a modified example of a sensor electrode layer. FIG. 11B is a plan view illustrating an example of a positional relationship between a sensing unit and a protruding portion when shear force is added in the in-plane direction.

FIG. 15A is a plan view illustrating a configuration of a sensor according to a modified example. FIG. 15B is a cross-sectional view taken along a XVB-XVB line in FIG. 15A.

MODE FOR CARRYING OUT THE INVENTION

Embodiments of the present disclosure will be described in the following order.

1. First Embodiment (Example of Sensor and Electronic Device Including the Same)
2. Second Embodiment (Example of Sensor and Electronic Device Including the Same)

1. First Embodiment

Configuration of Electronic Device

Figure 1:
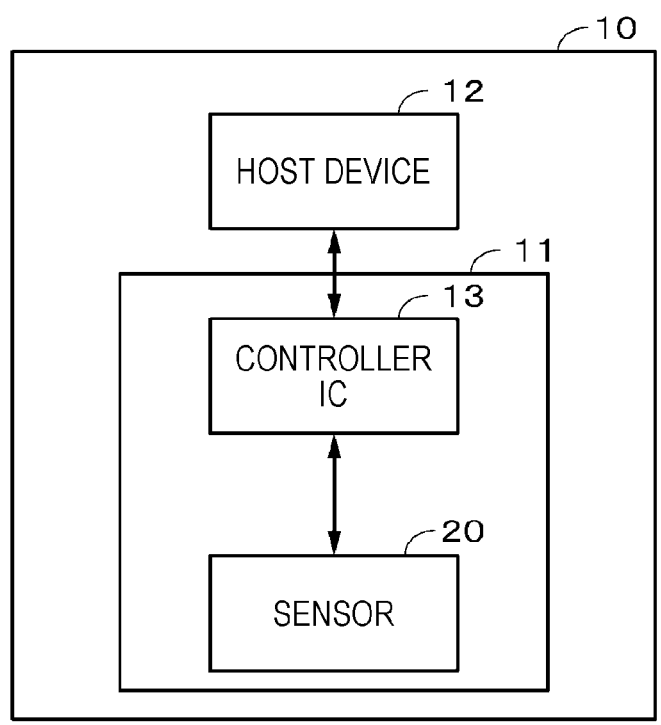
FIG. 1 is a block diagram illustrating a configuration of an electronic device according to a first embodiment of the present disclosure.

FIG. 1 illustrates a configuration of an electronic device 10 according to the first embodiment of the present disclosure. The electronic device 10 includes a sensor module 11, and a host device 12 serving as a main body of the electronic device 10. The electronic device 10 includes an exterior body such as a casing, detects a distribution of shear force added to the surface of the exterior body in an in-plane direction, using the sensor module 11, and operates in accordance with a detection result.

Sensor Module

The sensor module 11 includes a sensor 20, and a controller IC 13 serving as a control unit and a calculation unit. The sensor 20 is provided on the surface of the exterior body of the electronic device 10, detects a change in electrostatic capacitance that corresponds to the distribution of shear force added to the surface of the exterior body in the in-plane direction, and outputs an output signal corresponding to the change, to the controller IC 13. The controller IC 13 controls the sensor 20, detects the distribution of shear force added to the sensor 20, on the basis of the output signal supplied from the sensor 20, and outputs the distribution to the host device 12. The shape of the surface of the exterior body on which the sensor 20 is provided may be a planar surface or may be a curved surface.

Configuration of Sensor

Figure 2:
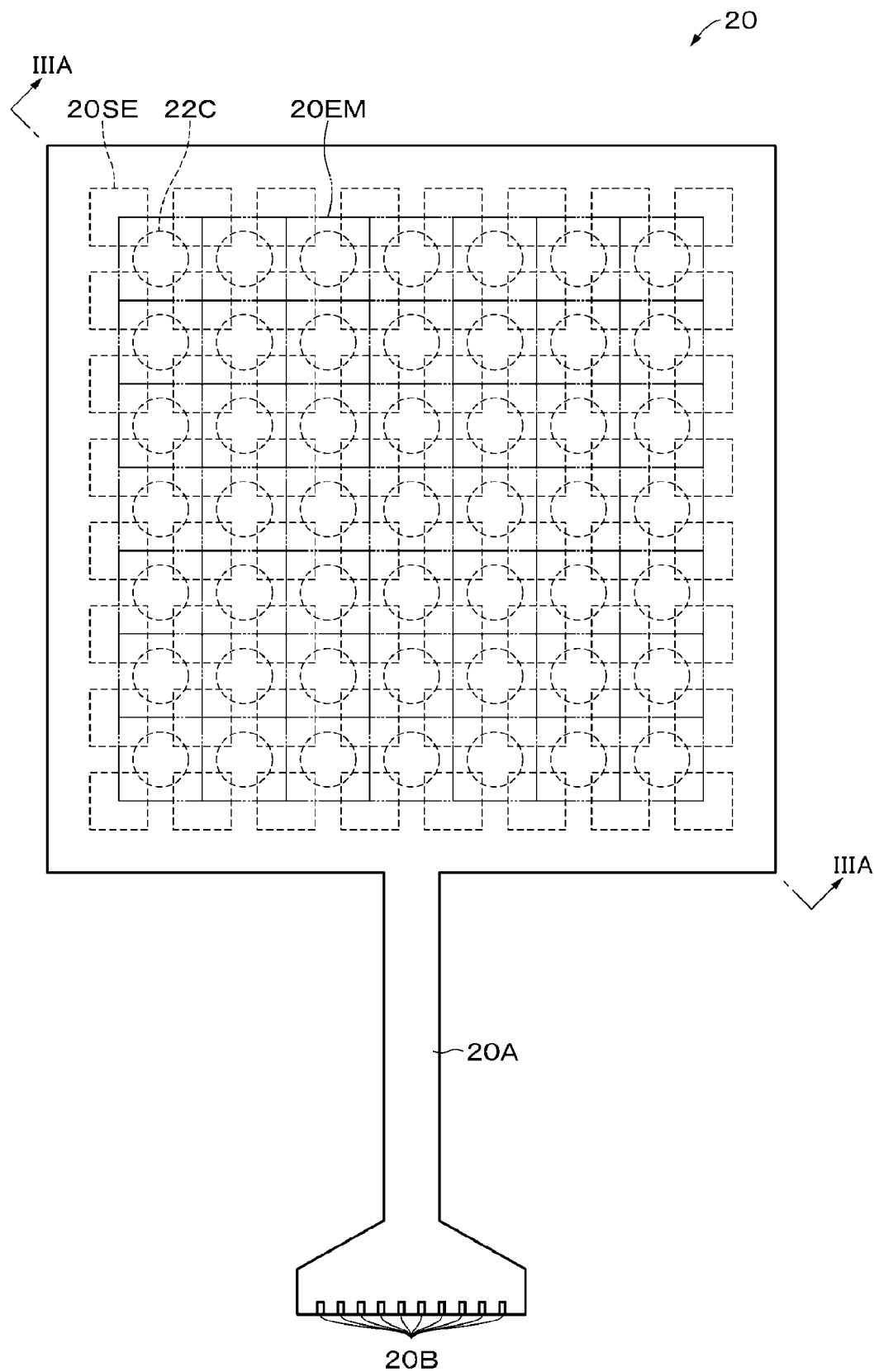
FIG. 2 is a plan view illustrating an external appearance of a sensor.

FIG. 2 illustrates an external appearance of the sensor 20. The sensor 20 is a capacitive shear force sensor that can detect a shear force distribution, and has a film shape. Note that, in the present disclosure, a film is defined to include a sheet. Because the sensor 20 has a film shape, the sensor 20 can be applied not only to a planar surface but also to a curved surface.

A connection portion 20A having a film shape is extended from a part of a rim of the sensor 20. A plurality of connection terminals 20B for connecting with a circuit board (not illustrated) of the host device 12 is provided at the leading end of the connection portion 20A. The controller IC 13 is provided on the circuit board. Note that the controller IC 13 may be provided on the connection portion 20A.

Figure 4:
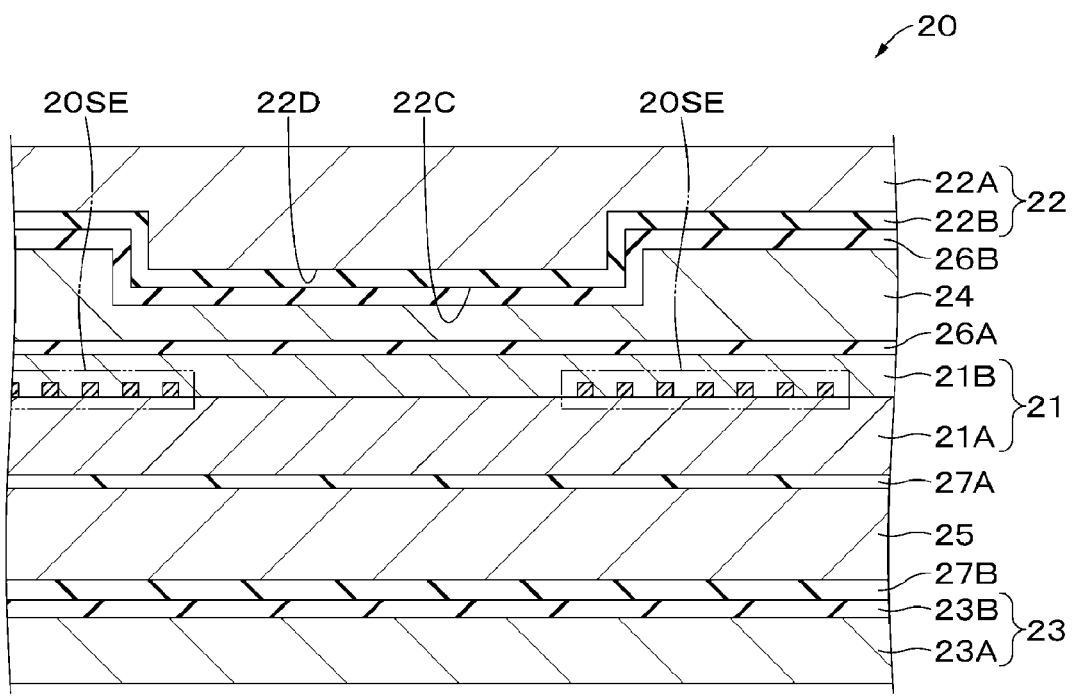
FIG. 4 is a cross-sectional view illustrating a part of FIG. 3A in an enlarged manner.

FIG. 3A illustrates a cross-section of the sensor taken along a IIIA-IIIA line in FIG. 2. FIG. 4 illustrates a part of FIG. 3A in an enlarged manner. The sensor 20 includes a sensor electrode layer 21 including a plurality of capacitive sensing units 20SE, electrode base materials 22 and 23, an elastic layer 24, a gap layer 25, and adhesion layer 26A, 26B, 27A, and 27B. The surface of the sensor 20 on the electrode base material 23 side is bonded via an adhesion layer (not illustrated) to the exterior body of the electronic device 10 such as a casing. Note that a curved line L illustrated in FIG. 3A indicates an electric force line.

The sensor electrode layer 21 and the electrode base material 22 are arranged in such a manner that the principal surfaces of the sensor electrode layer 21 and the electrode base material 22 face each other. The elastic layer 24 is provided between the principal surfaces of the sensor electrode layer 21 and the electrode base material 22. The sensor electrode layer 21 and the elastic layer 24 are bonded to each other by the adhesion layer 26A, and the electrode base material 22 and the elastic layer 24 are bonded to each other by the adhesion layer 26B. Note that the adhesion layers 26A and 26B are included as necessary, and need not be included in a case where the elastic layer 24 has adhesiveness, for example.

The sensor electrode layer 21 and the electrode base material 23 are arranged in such a manner that the principal surfaces of the sensor electrode layer 21 and the electrode base material 23 face each other. The gap layer 25 is provided between the principal surfaces of the sensor electrode layer 21 and the electrode base material 23. The sensor electrode layer 21 and the gap layer 25 are bonded to each other by the adhesion layer 27A, and the electrode base material 23 and the gap layer 25 are bonded to each other by the adhesion layer 27B. Note that the adhesion layers 27A and 27B are included as necessary, and need not be included in a case where the gap layer 25 has adhesiveness, for example.

Electrode Base Material

Figure 5:
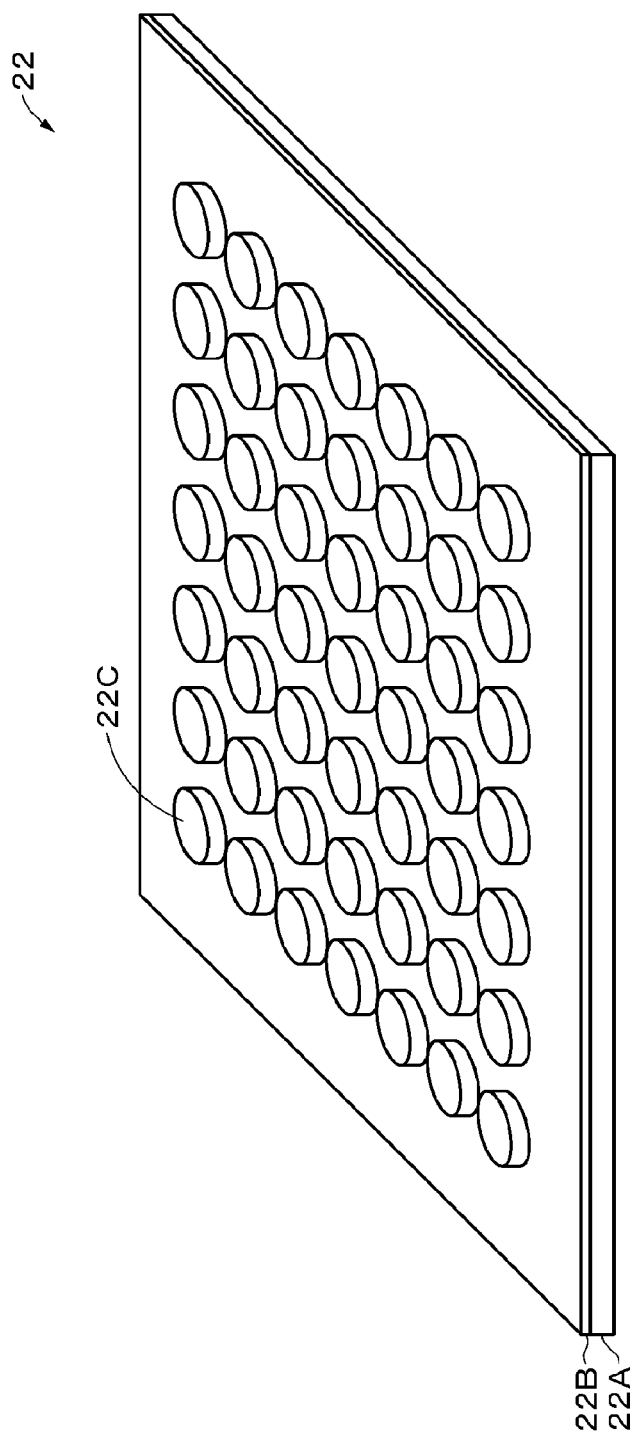
FIG. 5 is a perspective view illustrating a configuration of an electrode base material.

FIG. 5 illustrates a configuration of the electrode base material 22. The electrode base material 22 includes a plurality of protruding portions 22C each having a cylindrical shape, on a surface facing a first surface of the sensor electrode layer 21. The protruding portion 22C is an example of a probe portion that is displaced in the in-plane direction in accordance with elastic deformation of the elastic layer 24 that is caused by shear force, and changes electrostatic capacitance of the sensing unit 20SE. Four sensing units 20SE are provided in portions facing peripheral portions of the protruding portion 22C. The protruding portion 22C is provided at a position facing the center of a sensor element 20EM.

The electrode base material 22 is an electrode film having a stretching property (that is, stretchable electrode film). Because the electrode base material 22 has a stretching property, and a plurality of sensor elements 20EM is distributed in the plane of the sensor 20, a shear force distribution can be detected. Note that, if the electrode base material 22 is rigid, in a case where shear force is applied to a part of the plane of the sensor 20, because the protruding portions 22C in the entire plane are displaced in the in-plane direction, it becomes difficult to detect a shear force distribution.

The electrode base material 22 includes a base material 22A having a stretching property, and a reference electrode layer (hereinafter, referred to as "REF electrode layer") 22B provided on one principal surface of the base material 22A. The electrode base material 22 is arranged on the first surface side of the sensor electrode layer 21 in such a manner that the REF electrode layer 22B faces the first surface of the sensor electrode layer 21.

The base material 22A is a film including an elastomer. The elastomer is an elastomer of at least one type of a silicone series elastomer, an acrylic series elastomer, a urethane series elastomer, a styrene series elastomer, or the like, for example. Note that, in the present disclosure, the elastomer is defined to also include rubber.

The base material 22A includes a plurality of protruding portions 22D on a surface facing the first surface of the sensor electrode layer 21. The REF electrode layer 22B is provided on the base material 22A in such a manner as to follow the plurality of protruding portions 22D. The protruding portion 22C includes a protruding portion 22D, and the REF electrode layer 22B covering the protruding portion 22D.

The electrode base material 23 is an electrode having flexibility. The electrode base material 23 may be an electrode film having a stretching property (that is, stretchable electrode film). The electrode base material 23 includes a base material 23A having flexibility, and a REF electrode layer 23B having flexibility that is provided on one principal surface of the base material 23A. The electrode base material 23 is arranged on a second surface side of the sensor electrode layer 21 in such a manner that the REF electrode layer 23B faces the second surface of the sensor electrode layer 21.

The base material 23A is a film including a polymer resin. As the polymer resin, a polymer resin similar to a base material 21A described above can be exemplified. Examples of the polymer resin include polyethylene terephthalate (PET), polyethylene naphthalate (PEN), polycarbonate (PC), acrylic resin (PMMA), polyimide (PI), triacetylcellulose (TAC), polyester, polyamide (PA), aramid, polyethylene (PE), polyacrylate, polyether sulphone, polysulphone, polypropylene (PP), diacetylcellulose, polyvinyl chloride, epoxy resin, urea resin, urethane resin, melamine resin, cyclic olefin polymer (COP), norbornene series thermoplastic resin, or the like, but the polymer resin is not limited to these polymer resins. The base material 23A may have a stretching property. In this case, for example, a film including an elastomer is used as the base material 23A.

The REF electrode layers 22B and 23B are so-called ground electrodes, and have a ground potential. Shapes of the REF electrode layers 22B and 23B include, for example, a thin film shape, a foil shape, a mesh shape, or the like, but the shapes are not limited to these shapes. The REF electrode layer 22B may have a stretching property. Furthermore, the REF electrode layer 22B may have a stretching property as well.

The REF electrode layers 22B and 23B are only required to have electric conductivity. For example, an inorganic conductive layer including inorganic conductive material, an organic conductive layer including organic conductive material, an organic-inorganic conductive material including both inorganic conductive material and organic conductive material, or the like is used. The inorganic conductive material and the organic conductive material may be particles. The REF electrode layers 22B and 23B may be conductive cloth.

Examples of the inorganic conductive material include metal, metal oxide, or the like. Here, metal is defined to include semimetal. Examples of the metal include metal such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead, an alloy including two types or more of these metals, and the like, but the metal is not limited to these metals. Specific examples of the alloy include stainless steel, but the alloy is not limited to this. Examples of metal oxide include indium tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxide series, indium oxide-tin oxide series, zinc oxide-indium oxide-magnesium oxide series, or the like, but the metal oxide is not limited to these metal oxides.

Examples of the organic conductive material include carbon material, conductive polymer, or the like. Examples of the carbon material include carbon black, carbon fiber, fullerene, graphene, carbon nanotube, carbon microcoil, nanohorn, or the like, but the carbon material is not limited to these carbon materials. As the conductive polymer, for example, substituted or unsubstituted polyaniline, polypyrrole, polythiophene, or the like can be used, but the conductive polymer is not limited to these conductive polymers.

Because the electrode base materials 22 and 23 are provided on both principal surface sides of the sensor electrode layer 21, it is possible to prevent external noise (external electric field) from entering the sensor electrode layer 21 from both principal surface sides of the sensor 20. It is therefore possible to suppress false detection or a decline in detection accuracy of the sensor 20 that is caused by external noise.

Sensor Electrode Layer

As illustrated in FIG. 4, the sensor electrode layer 21 includes the base material 21A having a film shape and flexibility, the plurality of sensing units 20SE having a quadrangular shape that is provided on one principal surface of the base material 21A, and a protective layer 21B covering one principal surface of the base material 21A on which these sensing units 20SE are provided. The sensor electrode layer 21 may have a stretching property. The sensor electrode layer 21 includes a plurality of facing portions respectively facing the plurality of protruding portions 22C, and the four sensing units 20SE are provided to surround each facing portion.

As illustrated in FIG. 2, the plurality of sensing units 20SE is two-dimensionally arrayed in a matrix shape. More specifically, the plurality of sensor elements 20EM having a quadrangular shape is arrayed in a filled manner in the in-plane direction of the sensor 20. The center of the sensing unit 20SE is positioned at each vertex portion (each corner portion) of the sensor element 20EM. The sensor 20 is configured to detect shear force in each of the sensor elements 20EM.

The base material 21A includes a polymer resin and has flexibility. As the polymer resin, a polymer resin similar to the above-described base material 23A can be exemplified.

FIG. 6A illustrates the configuration of the sensing units 20SE. The sensing unit 20SE detects a change in electrostatic capacitance that corresponds to an overlapping area of the sensing unit 20SE and the protruding portion 22C in a thickness direction of the sensor 20. The sensing unit 20SE includes a pulse electrode (first electrode) 21C and a sense electrode (second electrode) 21D. The pulse electrode 21C and the sense electrode 21D are configured to form capacitance coupling. More specifically, the pulse electrode 21C and the sense electrode 21D have comb teeth shapes, and are arranged in such a manner that comb teeth portions engage with each other. In the sensing unit 20SE, shear force (electrostatic capacitance) is detected using a leak electric field between the pulse electrode 21C and the sense electrode 21D.

The pulse electrode 21C includes a plurality of sub electrodes $21C_1$ having a linear shape. The sense electrode (second electrode) 21D includes a plurality of sub electrode $21D_1$ having a linear shape. The plurality of sub electrodes $21C_1$ and $21D_1$ are alternately provided with being separated by a fixed interval. The adjacent sub electrodes $21C_1$ and $21D_1$ are configured to form capacitance coupling. Cables (not illustrated) are respectively laid out from the pulse electrode 21C and the sense electrode 21D, pulled around the rim portion of the base material 21A, and then connected to the connection terminals 20B through the connection portion 20A.

The protective layer 21B protects the sensing unit 20SE. For example, the protective layer 21B is an insulative film such as a coverlay film, or an insulative resist material. Note that the adhesion layer 26A may be directly provided on one surface of the base material 21A on which the sensing units 20SE are provided, instead of the sensor 20 including the protective layer 21B.

It is preferable that the sensor electrode layer 21 and the connection portion 20A are integrally formed by one flexible printed circuit (FPC). By integrally forming the sensor electrode layer 21 and the connection portion 20A in this manner, it is possible to reduce the number of components of the sensor 20. Furthermore, it is possible to enhance the impact durability in connecting the sensor 20 and the circuit board (not illustrated).

Elastic Layer

The elastic layer 24 has an insulation property, and is configured to be elastically deformed by shear force added in the in-plane direction of the sensor 20. The sensitivity of the sensor 20 can be adjusted in accordance with an elasticity degree of the elastic layer 24 in the in-plane direction of the sensor 20. The elastic layer 24 may be provided on a support body as necessary. As the material of the support body, for example, an elastomer or the like can be used.

It is preferable that the elasticity degree of the elastic layer 24 in the in-plane direction of the sensor 20 is smaller than an elasticity degree of the elastic layer 24 in the thickness direction of the sensor 20. Therefore, in a case where pressure is added in the thickness direction of the sensor 20, it is possible to prevent the elastic layer 24 from being crushed in the thickness direction of the sensor 20. Accordingly, it is possible to enhance separability between shear force and pressure. Thus, it is possible to enhance detection accuracy of a shear force distribution of the sensor 20.

The elastic layer 24 includes at least one type of foamed resin, an elastomer, gel, woven cloth, unwoven cloth, or a mesh structure, for example. From the viewpoint of prevention of the elastic layer 24 from being crushed in the thickness direction of the sensor 20, it is preferable that the elastic layer 24 includes at least one type of an elastomer or gel. The foamed resin is so-called sponge, and is at least one type of foamed polyurethane (polyurethane foam), foamed polyethylene (polyethylene foam), foamed polyolefin (polyolefin foam), foamed acrylic (acrylic foam), sponge rubber, or the like, for example. The elastomer is an elastomer of at least one type of a silicone series elastomer, an acrylic series elastomer, a urethane series elastomer, a styrene series elastomer, or the like, for example.

Furthermore, it is also preferable that the elastic layer 24 includes gel and at least one type of woven fabric, unwoven cloth, or a mesh structure buried in the gel. In the elastic layer 24 having such a configuration, while at least one type of woven fabric, unwoven cloth, or a mesh structure prevents the elastic layer 24 from being crushed, in a case where pressure is added in the thickness direction of the sensor 20, the elastic layer 24 can be easily deformed in a case where shear force is added in the in-plane direction of the sensor 20. Accordingly, it is possible to enhance separability between shear force and pressure.

Furthermore, it is also preferable that the elastic layer 24 includes gel and particles of at least one type of columnar particles or fibrous particles that are buried in the gel, and the particles are vertically oriented in such a manner that a long axis of particles extends in the thickness direction of a deformed layer. In the elastic layer 24 having such a configuration, while the above-described particles prevent the elastic layer 24 from being crushed, in a case where pressure is added in the thickness direction of the sensor 20, the elastic layer 24 can be easily deformed because the above-described particles are inclined, in a case where shear force is added in the in-plane direction of the sensor 20. Accordingly, it is possible to enhance separability between shear force and pressure. For example, electrostatic flocking, magnetic field orientation, or the like can be used as an orientation method of the above-described particles. Note that, in a case where magnetic field orientation is used as an orientation method of the above-described particles, magnetic particles are used as the above-described particles.

Gap Layer

The gap layer 25 has an insulation property, and separates the electrode base material 23 and the sensor electrode layer 21. An initial electrostatic capacitance of the sensor 20 is adjusted by the thickness of the gap layer 25. It is preferable that an elasticity degree of the gap layer 25 in the in-plane direction of the sensor 20 is larger than an elasticity degree of the elastic layer 24 in the in-plane direction of the sensor 20. Therefore, in a case where shear force is added in the in-plane direction of the sensor 20, it is possible to prevent the gap layer 25 from being elastically deformed in the in-plane direction of the sensor 20, before the elastic layer 24 is elastically deformed in the in-plane direction of the sensor 20. Accordingly, it is possible to suppress a decline in detection sensitivity of shear force.

The gap layer 25 may have adhesiveness, and needs not have adhesiveness. In a case where the gap layer 25 has adhesiveness, the electrode base material 23 and the sensor electrode layer 21 are bonded to each other by the gap layer 25. The gap layer 25 having adhesiveness is formed by, for example, a single adhesion layer or a stacked structure obtained by providing adhesion layers on both surfaces of the base material (for example, double-sided adhesive film).

As an adhesive included in the above-described adhesion layer, for example, at least one type of an acrylic series adhesive, a silicone series adhesive, or a urethane series adhesive can be used. Note that, in the present disclosure, pressure sensitive adhesion is defined as one type of adhesion. According to this definition, a pressure sensitive adhesion layer is regarded as one type of an adhesion layer.

Adhesion Layer

The adhesion layers 26A, 26B, 27A, and 27B are each formed by, for example, an adhesive having an insulation property, or a double-sided adhesive film. As the adhesive, an adhesive similar to the adhesive of the above-described the gap layer 25 can be exemplified.

Operation of Sensor

Hereinafter, an example of an operation of detecting a shear force distribution of the sensor 20 having the above-described configuration will be described. If shear force is added in the in-plane direction of the sensor 20, as illustrated in FIG. 3B, the elastic layer 24 is elastically deformed in the in-plane direction of the sensor 20, and relative positions of the electrode base material 22 and the sensor electrode layer 21 in the in-plane direction of the sensor 20 are displaced. Therefore, as illustrated in FIG. 6B, the protruding portion 22C moves to above the sensing unit 20SE, and an electrostatic capacitance of the sensing unit 20SE changes. On the basis of the change in electrostatic capacitance, the controller IC 13 calculates the direction and the magnitude of shear force added to the sensor 20, and outputs the direction and the magnitude to the host device 12.

As illustrated in FIG. 6A, in the sensor electrode layer 21, the sensing units 20SE are arranged toward four directions from the facing portion facing the protruding portion 22C. Accordingly, by detecting the respective changes in electrostatic capacitance of the sensing units 20SE arranged toward the four directions, the controller IC 13 can calculate the direction and the magnitude of shear force added to the sensor 20.

Manufacturing Method of Sensor

A manufacturing method of the sensor 20 having the above-described configuration will be described with reference to FIGS. 7A to 7E. First of all, the base material 22A having one surface on which the plurality of protruding portions 22D is provided is manufactured. Next, as illustrated in FIG. 7A, the REF electrode layer 22B is formed on one surface of the base material 22A in such a manner as to follow the protruding portion 22D. Therefore, the electrode base material 22 having the protruding portions 22C on one surface is obtained.

As a formation method of the REF electrode layer 22B, either method of a dry process and a wet process may be used. As a dry process, for example, a sputtering method, an evaporation method, or the like can be used, but the dry process is not specifically limited to these methods. As a wet process, a coating method, an applying method, or the like can be used, but the wet process is not specifically limited to these methods. As the applying method, for example, there is a method of applying stretchable conductive ink to one surface of the base material 22A.

Next, as illustrated in FIG. 7B, the elastic layer 24 is formed by applying fluid resin material onto the REF electrode layer 22B and causing the resin material to cure. Note that a formation method of the elastic layer 24 is not limited to this, and the electrode base material 22 and the elastic layer 24 may be bonded to each other by preliminarily forming a recess and a projection on one surface of the elastic layer 24 in such a manner that the recess and the projection have inverted shapes of a projection and a recess on one surface of the electrode base material 22, and causing the recesses and the projections of the electrode base material 22 and the elastic layer 24 to engage with each other.

Next, after a metal layer is formed on one surface of the base material 21A, the metal layer is patterned by photolithography and etching. Therefore, as illustrated in FIG. 7C, the pulse electrode 21C and the sense electrode 21D are formed on one surface of the base material 21A. Next, as illustrated in FIG. 7D, one surface of the base material 21A is covered by the protective layer 21B. Therefore, the sensor electrode layer 21 is obtained.

Next, as illustrated in FIG. 7E, the electrode base material 22 having one surface on which the elastic layer 24 is formed is bonded to one surface of the sensor electrode layer 21. Next, the preliminarily-manufactured electrode base material 23 is bonded to another surface of the sensor electrode layer via the gap layer 25. Therefore, the sensor 20 illustrated in FIG. 3A is obtained.

Effect

The sensor 20 according to the first embodiment includes the sensor electrode layer 21 including the plurality of capacitive sensing units 20SE, the electrode base material 22 provided to face the first surface of the sensor electrode layer 21, the elastic layer 24 that is provided between the electrode base material 22 and the sensor electrode layer 21, and is configured to be elastically deformed by shear force added in the in-plane direction of the sensor 20, the electrode base material 23 provided to face the second surface of the sensor electrode layer 21, and the gap layer 25 provided between the electrode base material 23 and the sensor electrode layer 21. Furthermore, the electrode base material 22 includes the plurality of protruding portions 22C facing the first surface of the sensor electrode layer 21, and in the sensor electrode layer 21, the sensing units 20SE are arranged toward the four directions from the facing portion facing the protruding portion 22C. In the sensor 20 having the above-described configuration, if shear force is added in the in-plane direction of the sensor 20, the elastic layer 24 is elastically deformed, and relative positions of the electrode base material 22 and the sensor electrode layer 21 in the in-plane direction of the sensor 20 are displaced. Therefore, the protruding portion 22C is displaced in the in-plane direction of the sensor 20, and changes the electrostatic capacitance of the sensing unit 20SE. On the basis of the change in electrostatic capacitance, the controller IC 13 can calculate a shear force distribution (specifically, direction and magnitude of shear force in each of the sensor elements 20EM).

Modified Example

Modified Example of Electrode Base Material

The base material 22A may be omitted. In other words, the sensor 20 may include the REF electrode layer 22B in place of the electrode base material 22. In this case, the REF electrode layer 22B includes the plurality of protruding portions 22C on one surface. Examples of the REF electrode layer 22B having such a configuration include the REF electrode layer 22B including a conductive film having a stretching property, and a plurality of conductive discs bonded to one surface of the conductive film. As the conductive film having a stretching property, for example, woven fabric woven using conductive threads, an elastomer film including conductive fine particles, or the like can be used. The conductive disc includes conductive fine particles and resin material, for example. An elastomer may be used as resin material. The plurality of conductive discs is bonded to one surface of the conductive film by a conductive adhesive, for example.

Similarly, the base material 23A may be omitted. In other words, the sensor 20 may include the REF electrode layer 23B in place of the electrode base material 23. In this case, the REF electrode layer 23B may be an exterior body of the electronic device 10 such as a casing.

Figure 8:
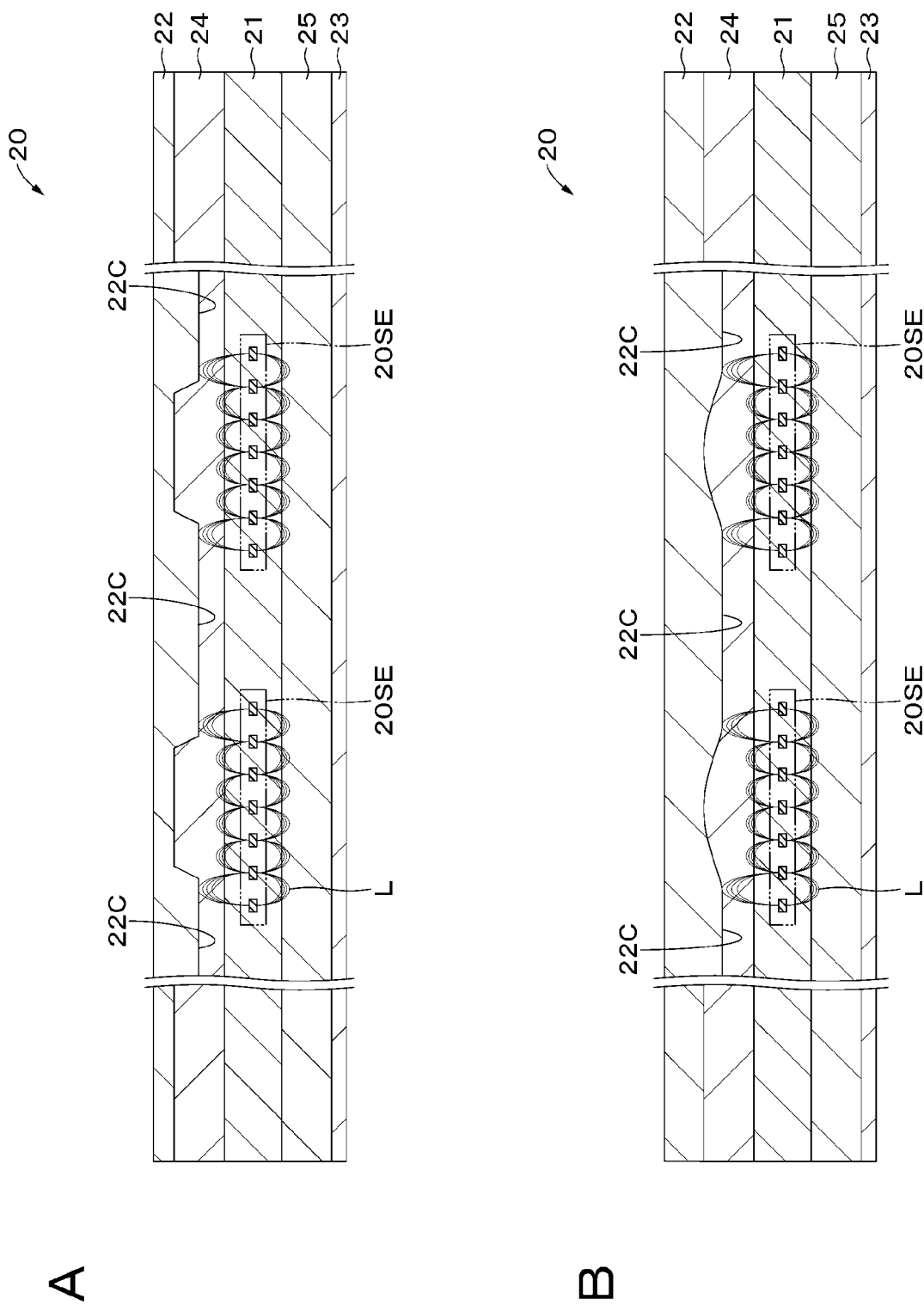
FIGS. 8A and 8B are cross-sectional views each illustrating a modified example of an electrode base material.

In the first embodiment, the description has been given of a case where the protruding portions 22C has a cylindrical shape, but the shape of the protruding portions 22C is only required to be a shape protruding toward the first surface of the sensor electrode layer 21, and the shape is not specifically limited. For example, the protruding portions 22C may have a frustum shape such as a frustum shape of a circular cone as illustrated in FIG. 8A. Furthermore, as illustrated in FIG. 8B, one surface of the electrode base material 22 may have a waved surface on which the surface is recessed in a portion facing the sensing unit 20SE, and protrudes in a portion facing the peripheral portion of the sensing unit 20SE. Furthermore, as illustrated in FIG. 9A, the protruding portion 22C may be formed by making one surface of the electrode base material 22 into a recessed shape, and making another surface into a protruding shape.

Figure 9:
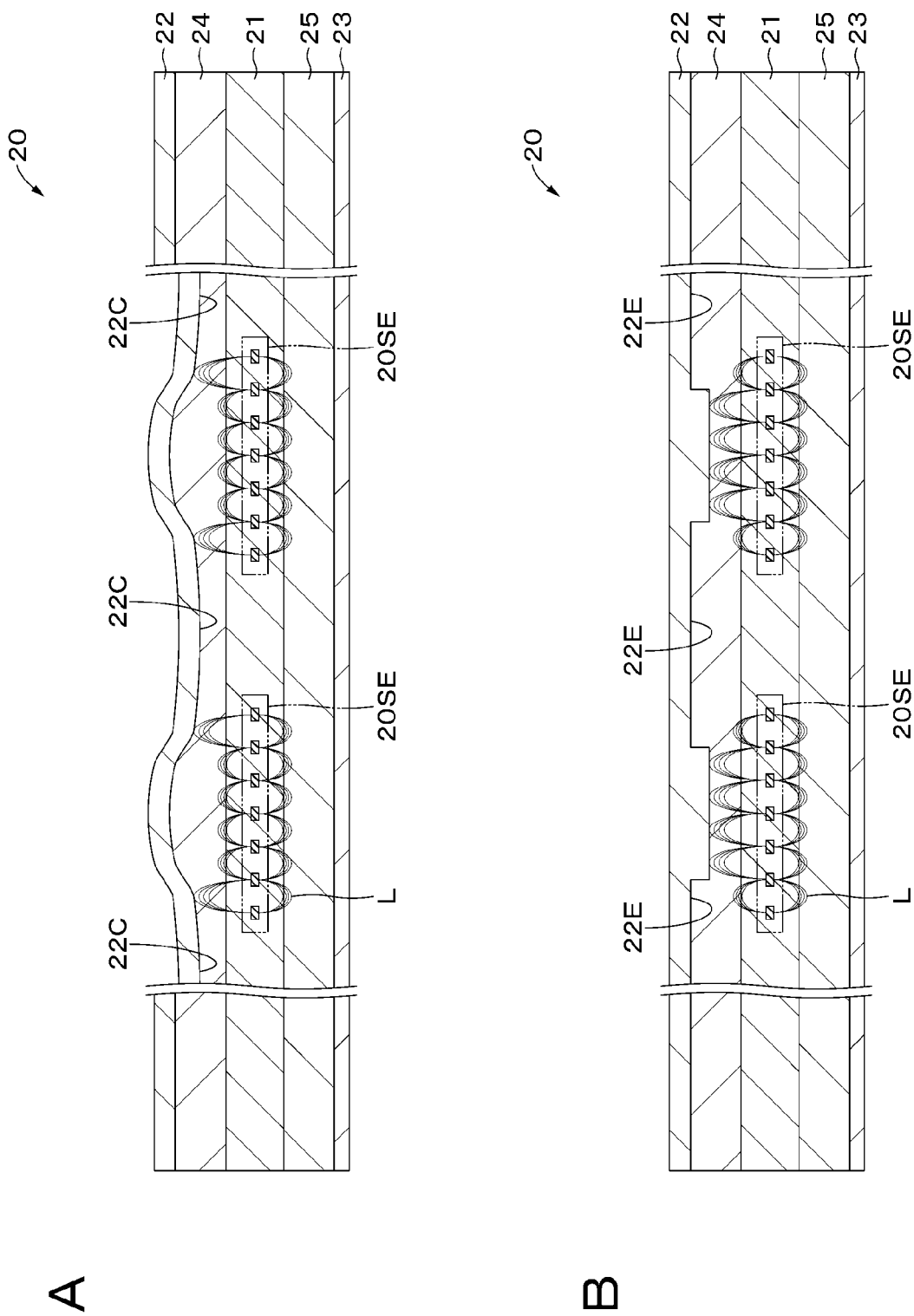
FIGS. 9A and 9B are cross-sectional views each illustrating a modified example of an electrode base material.

In the first embodiment, the description has been given of a case where the electrode base material 22 includes the plurality of protruding portions 22C on the surface facing the first surface of the sensor electrode layer 21, but a plurality of recesses 22E may be included in place of the plurality of protruding portions 22C as illustrated in FIG. 9B.

Figure 10:
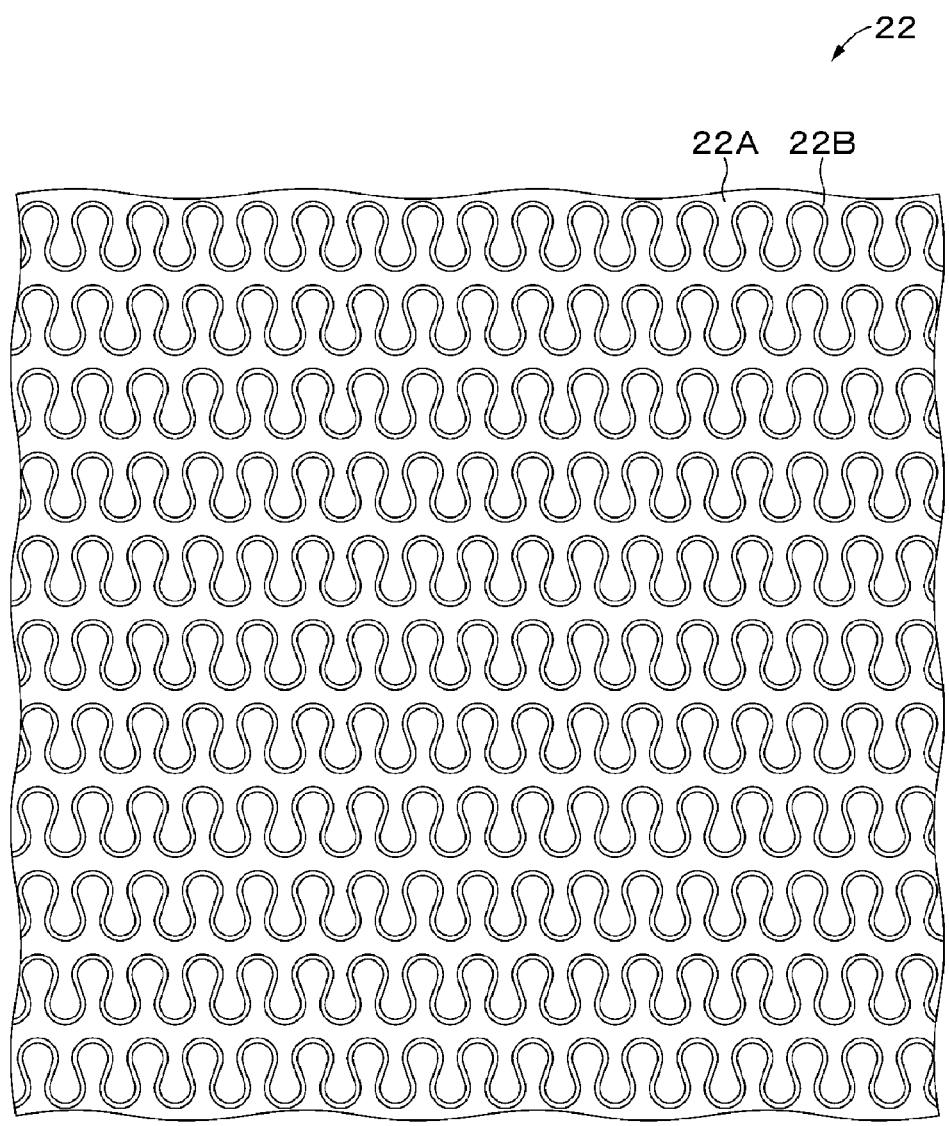
FIG. 10 is a plan view illustrating a modified example of an electrode base material.

In the first embodiment, the description has been given of the configuration in which the REF electrode layer 22B is provided over the entire one surface of the base material 22A, but the REF electrode layer 22B may have a predetermined pattern shape such as a meandering shape as illustrated in FIG. 10.

In the first embodiment, the description has been given of a case where the electrode base material 22 has a stretching property, but the electrode base material 22 needs not have a stretching property. In this case, although the sensor 20 can detect shear force, because the protruding portions 22C in the entire plane are displaced in a case where shear force is applied to a part of the plane, it becomes difficult to detect a shear force distribution.

Modified Example of Sensor Electrode Layer

In the first embodiment, the description has been given of a case where the sensing units 20SE have a quadrangular shape, but as illustrated in FIG. 11A, the sensing units 20SE may have an arc shape. In this case, the plurality of sensing units 20SE having an arc shape is arranged on a circle around a portion facing the protruding portion 22C.

Also in the sensor 20 having the above-described configuration, by the protruding portion 22C serving as a probe portion moving in the in-plane direction as illustrated in FIG. 11B, the electrostatic capacitance of the sensing unit 20SE changes. Furthermore, the shape of the sensing units 20SE is not limited to a quadrangular shape and an arc shape, and may be a circular shape, an elliptical shape, a multangular shape other than a quadrangular shape, or the like.

In the first embodiment, the description has been given of a case where the sensor electrode layer 21 includes a facing portion facing the sensing unit 20SE, and four sensing units 20SE are provided around the facing portion, but one sensing unit 20SE, two or three sensing units 20SE, or five or more sensing units 20SE may be provided around the facing portion. For example, by arranging two sensing units 20SE in such a manner as to sandwich the facing portion, it is possible to detect shear force in a straight line direction.

Modified Example of Elastic Layer

Figure 12:
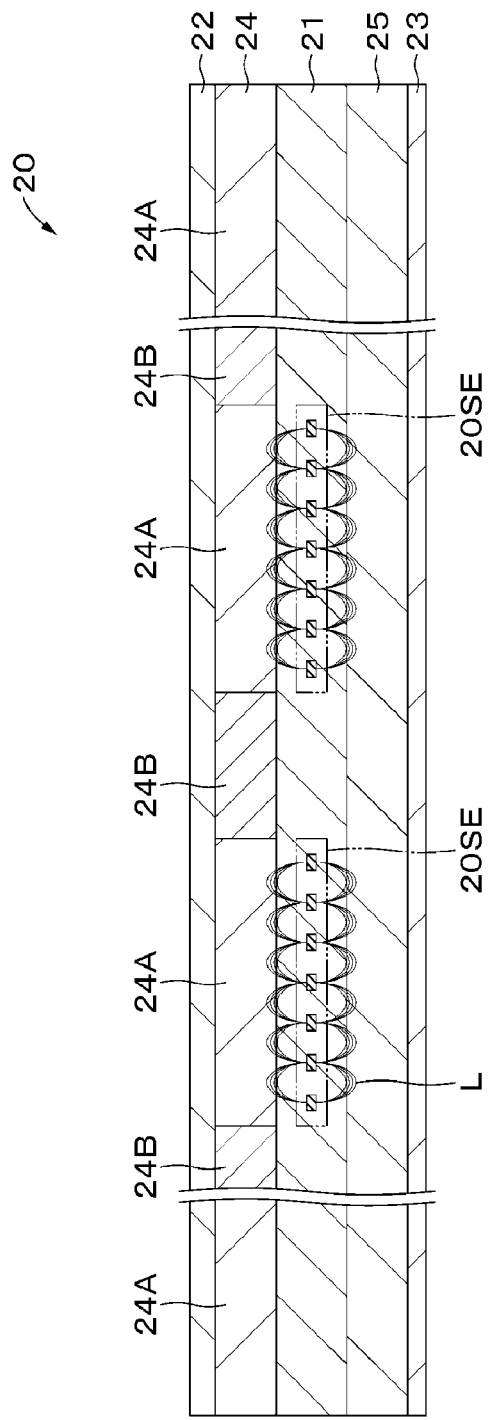
FIG. 12 is a plan view illustrating a modified example of an elastic layer.

In the first embodiment, the description has been given of a case where a probe portion corresponds to the protruding portion 22C provided on the electrode base material 22, but the probe portion may be provided on the elastic layer 24 in the following manner. More specifically, as illustrated in FIG. 12, the elastic layer 24 may include a first portion 24A having a first permittivity, and a second portion 24B having a second permittivity different from the first permittivity, in the in-plane direction, and the first portion 24A may be provided to face the sensing unit 20SE. In this case, the second portion 24B corresponds to the probe portion. Either one of the first portion 24A and the second portion 24B may be hollow. The first permittivity may be higher than the second permittivity, or the first permittivity may be lower than the second permittivity.

Note that the sensor 20 may include probe portions on both of the electrode base material 22 and the elastic layer 24. More specifically, the sensor 20 may include both of the electrode base material 22 having the plurality of protruding portions 22C on one surface, and the elastic layer 24 including the first portion 24A and the second portion 24B. In this case, it is preferable that the permittivity of the second portion 24B facing the protruding portion 22C is higher than the permittivity of the first portion 24A facing a recess between adjacent protruding portions 22C. This is for enhancing the sensitivity of the sensor 20 because a change in electrostatic capacitance of the sensing unit 20SE that is caused when shear force is added to the sensor 20 can be made larger. Furthermore, the sensor 20 may include the elastic layer 24 including the first portion 24A and the second portion 24B, in place of the gap layer 25.

Modified Example of Sensor

Figure 13:
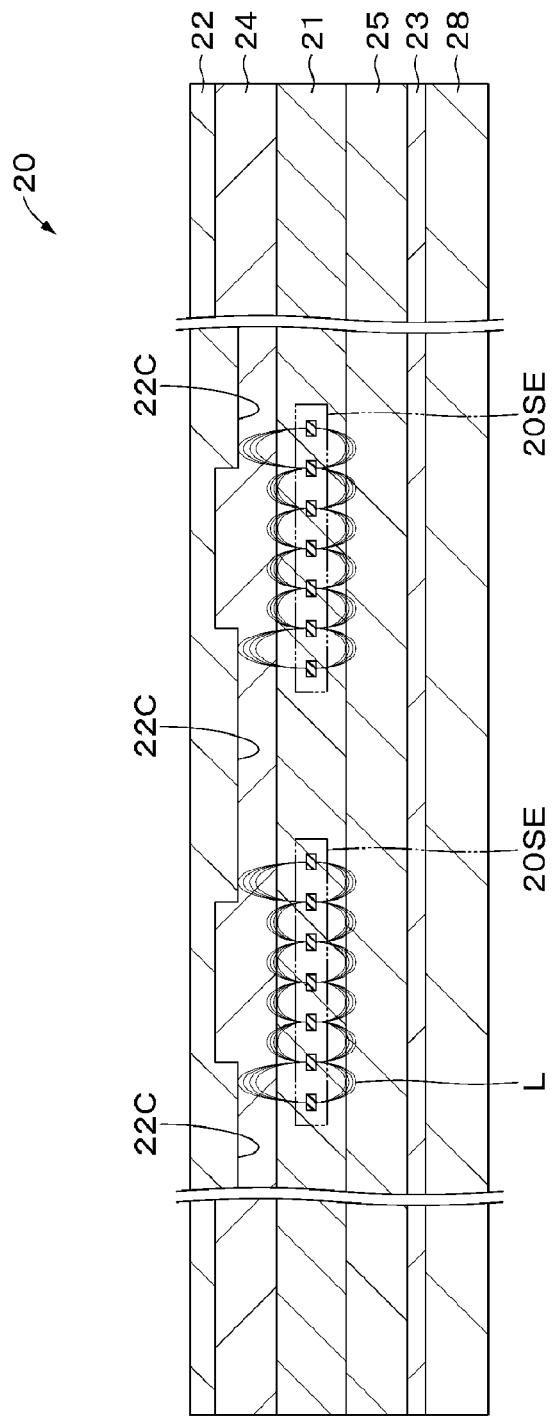
FIG. 13 is a cross-sectional view illustrating a modified example of a sensor.

As illustrated in FIG. 13, the sensor 20 may further include an elastic layer 28 on the back surface corresponding to the electrode base material 23 side. The elasticity degree of the elastic layer 28 in the thickness direction of the sensor 20 is smaller than an elasticity degree of the elastic layer 24 in the thickness direction of the sensor 20. Therefore, in a case where pressure is added in the thickness direction of the sensor 20, because the elastic layer 28 is crushed before the elastic layer 24 is crushed, the elastic layer 24 is prevented from being crushed. Accordingly, it is possible to enhance separability between shear force and pressure. Thus, it is possible to enhance detection accuracy of a shear force distribution of the sensor 20. The elastic layer 28 includes at least one type of foamed resin, an elastomer, woven cloth, or unwoven cloth, for example. As the foamed resin and the elastomer, foamed resin and an elastomer similar to those of the elastic layer 24 can be exemplified.

In a case where the gap layer 25 is an elastic layer configured to be elastically deformed by pressure added in the thickness direction of the sensor 20, it is preferable that an elasticity degree of the elastic layer 28 in the thickness direction of the sensor 20 is smaller than elasticity degrees of the elastic layer 24 and the gap layer 25 in the thickness direction of the sensor 20. Therefore, in a case where pressure is added in the thickness direction of the sensor 20, because the elastic layer 28 is crushed before the elastic layer 24 and the gap layer 25 are crushed, the elastic layer 24 and the gap layer 25 are prevented from being crushed. Accordingly, it is possible to enhance separability between shear force and pressure. Thus, it is possible to enhance detection accuracy of a shear force distribution of the sensor 20.

It is preferable that the elasticity degree of the elastic layer 28 in the in-plane direction of the sensor 20 is larger than an elasticity degree of the elastic layer 24 in the in-plane direction of the sensor 20. Therefore, in a case where shear force is added in the in-plane direction of the sensor 20, it is possible to prevent the elastic layer 28 from being elastically deformed in the in-plane direction of the sensor 20, before the elastic layer 24 is elastically deformed in the in-plane direction of the sensor 20. Accordingly, it is possible to suppress a decline in detection sensitivity of shear force.

Figure 14:
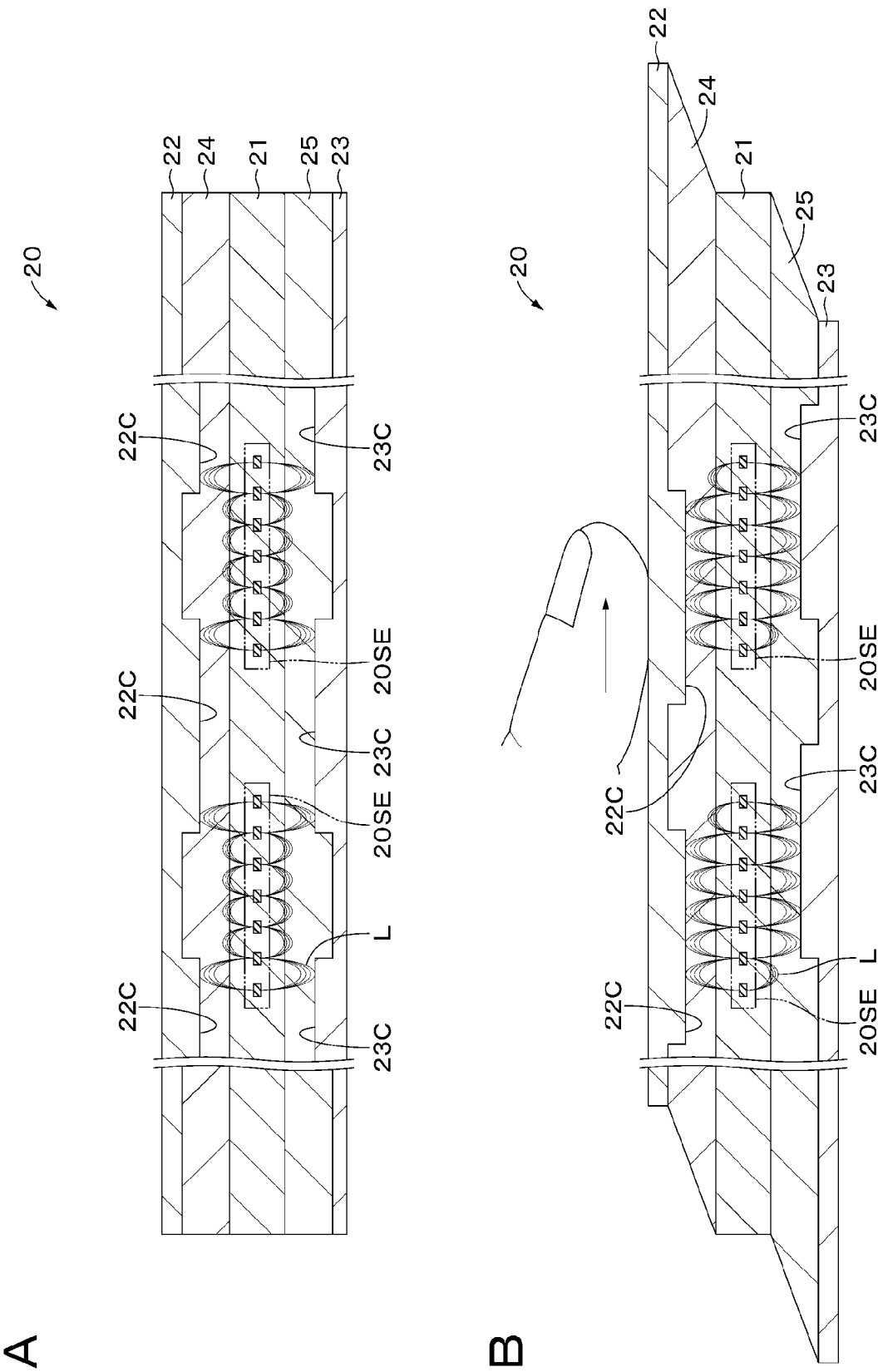
FIG. 14A is a cross-sectional view illustrating a modified example of a sensor.
FIG. 14B is a cross-sectional view illustrating a state of a sensor when shear force is added in the in-plane direction.

As illustrated in FIG. 14A, the electrode base material 23 may include a plurality of protruding portions 23C facing the first surface of the sensor electrode layer 21. In this case, the plurality of protruding portions 23C is respectively provided at positions facing the plurality of protruding portions 22C. Furthermore, as the gap layer 25, a layer similar to the elastic layer 24 in the first embodiment is used. Moreover, the sensor electrode layer 21 may have a stretching property.

In the sensor 20 having the above-described configuration, if shear force is added in the in-plane direction of the sensor 20, as illustrated in FIG. 14B, the elastic layer 24 and the gap layer 25 are elastically deformed in the in-plane direction of the sensor 20. Therefore, relative positions of the electrode base material 22 and the sensor electrode layer 21 in the in-plane direction of the sensor 20 are displaced, and relative positions of the electrode base material 23 and the sensor electrode layer 21 in the in-plane direction of the sensor 20 are displaced. Accordingly, the protruding portion 22C moves to above the sensing unit 20SE, and the protruding portion 23C moves to below the sensing unit 20SE. By the movement, the electrostatic capacitance of the sensing unit 20SE changes. On the basis of the change in electrostatic capacitance, the controller IC 13 calculates the direction and the magnitude of shear force added to the sensor 20, and outputs the direction and the magnitude to the host device 12.

In the sensor 20 having the above-described configuration, because a change in electrostatic capacitance of the sensing unit 20SE becomes larger, the sensitivity of the sensor 20 can be enhanced. Note that, instead of the electrode base material 23 including the plurality of protruding portions 23C, the elastic layer 24 according to the modified example of the first embodiment may be included as the gap layer 25, or the electrode base material 23 may include the plurality of protruding portions 23C and the elastic layer 24 according to the modified example of the first embodiment may be included as the gap layer 25. Furthermore, the electrode base material 23 may include a plurality of recesses in place of the plurality of protruding portions 23C.

In the first embodiment, the description has been given of a case where the sensor 20 includes the gap layer 25 and the electrode base material 23, but the gap layer 25 and the electrode base material 23 are included as necessary, and may be omitted. Nevertheless, in a case where the sensor 20 does not include the gap layer 25 and the electrode base material 23, it is preferable that an exterior body such as a casing on which the sensor 20 is provided includes the gap layer 25 and the electrode base material 23. The electrode base material 23 may be an exterior body of the electronic device 10 such as a casing.

In the first embodiment, the description has been given of a case where the sensor 20 includes the plurality of sensor elements 20EM, but the sensor 20 may include one sensor element 20EM.

FIG. 15A illustrates a configuration of a sensor 30 according to a modified example. FIG. 15B illustrates a cross-section taken along a XVB-XVB line in FIG. 15A. The sensor 30 is different from the sensor 20 according to the first embodiment in that the sensor 30 includes a sensor electrode layer 31 including a sensing unit 30SE having a spiral shape, and an electrode base material 32 including a protruding portion 32C having a spiral shape. The protruding portion 32C having a spiral shape may be provided to face a clearance portion of the sensing unit 30SE having a spiral shape, or may be provided to face the sensing unit 30SE having a spiral shape. Note that, in the sensor 30, components similar to those of the sensor 20 according to the first embodiment are assigned the same reference numerals, and the description will be omitted. In the sensor 30 having the above-described configuration, it is possible to detect shear force irrespective of direction.

Example of Electronic Device

The present disclosure can be applied to various electronic devices including an exterior body such as a casing. For example, the present disclosure can be applied to a personal computer, a mobile phone such as a smartphone, a television, a remote controller, a camera, a game machine, a navigation system, an electronic book, an electronic dictionary, a portable music player, a keyboard, a wearable terminal such as a smart watch and a head-mounted display, a radio, a stereo, a medical device, a robot, or the like.

Example Other Than Electronic Device

The present disclosure is not limited to an electronic device, and can also be applied to various devices other than an electronic device. For example, the present disclosure can be applied to an electronic device such as an electrical tool, a refrigerator, an air conditioner, a water heater, a microwave oven, a dishwasher, a washing machine, a drying machine, an illumination device, or a toy. Moreover, the present disclosure can also be applied to an architectural structure including a residential house, an architectural member, a vehicle, furniture such as a table and a desk, a manufacturing apparatus, an analysis device, or the like. Examples of the architectural member include paving stones, wall material, floor tiles, a floor board, or the like. Examples of the vehicle include a wheeled vehicle (for example, automobile, motorcycle, and the like), a ship, a submarine, a rail vehicle, an airplane, a space ship, an elevator, a playing machine, or the like.

2. Second Embodiment

Figure 16:
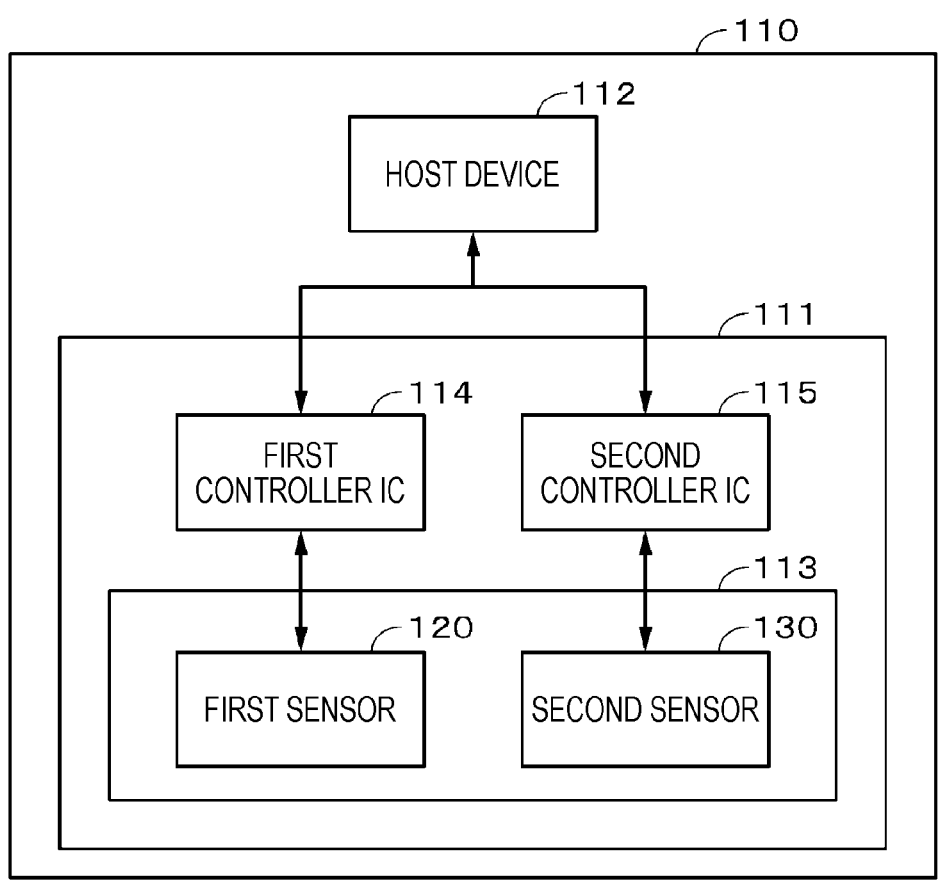
FIG. 16 is a block diagram illustrating a configuration of an electronic device according to a second embodiment of the present disclosure.

FIG. 16 illustrates a configuration of an electronic device 110 according to the second embodiment of the present disclosure. The electronic device 110 includes a sensor module 111, and a host device 112 serving as a main body of the electronic device 110. The electronic device 110 includes an exterior body such as a casing, detects a distribution of shear force added to the surface of the exterior body in the in-plane direction, and a distribution of pressure added to the surface of the exterior body in a vertical direction, using the sensor module 11, and operates in accordance with a detection result.

Sensor Module

The sensor module 111 includes a stack-type sensor 113, a first controller IC 114 serving as a first control unit, and a second controller IC 115 serving as a second control unit. The stack-type sensor 113 can detect both a shear force distribution and a pressure distribution, includes a first sensor 120 that detects a pressure distribution, and a second sensor 130 that detects a shear force distribution, and is provided on the surface of the exterior body of the electronic device 10.

The first sensor 120 detects a change in electrostatic capacitance that corresponds to the distribution of pressure added to the surface of the exterior body in the vertical direction, and outputs an output signal corresponding to the change, to the first controller IC 114. The first controller IC 114 controls the first sensor 120, detects the distribution of pressure added to the first sensor 120, on the basis of the output signal supplied from the first sensor 120, and outputs the distribution to the host device 112.

The second sensor 130 detects a change in electrostatic capacitance that corresponds to the distribution of shear force added to the surface of the exterior body in the in-plane direction, and outputs an output signal corresponding to the change, to the second controller IC 115. The second controller IC 115 controls the second sensor 130, detects the distribution of shear force added to the second sensor 130, on the basis of the output signal supplied from the second sensor 130, and outputs the distribution to the host device 112.

Stack-Type Sensor

Figure 17:
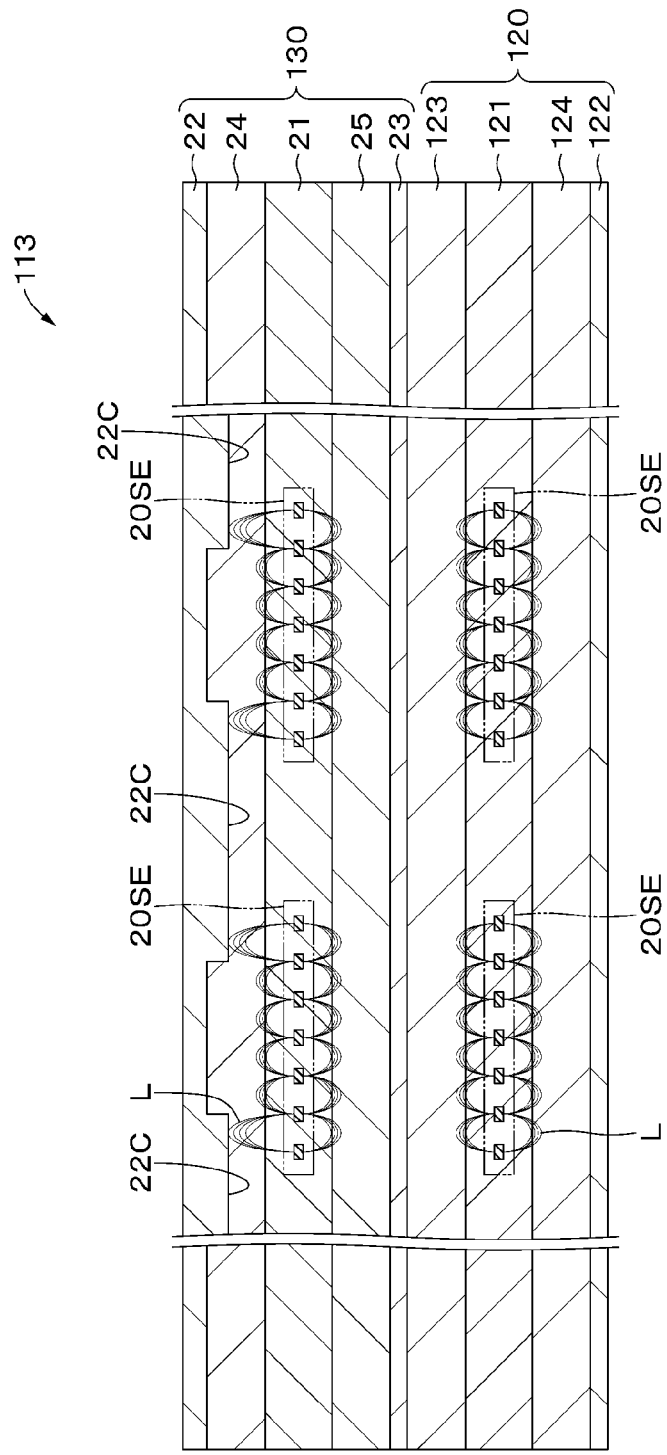
FIG. 17 is a cross-sectional view illustrating a configuration of a stack-type sensor.

FIG. 17 illustrates a configuration of the stack-type sensor 113 according to the second embodiment of the present disclosure. As described above, the stack-type sensor 113 includes the first sensor 120 and the second sensor 130, and the second sensor 130 is provided on the first sensor 120. The surface of the stack-type sensor 113 on the first sensor 120 side is bonded via an adhesion layer (not illustrated) to the exterior body of the electronic device 110. Because the second sensor 130 is similar to the sensor 20 according to the first embodiment, here, only the configuration of the first sensor 120 will be described.

The first sensor 120 includes a capacitive sensor electrode layer 121, an electrode base material 122, an elastic layer 123, and a gap layer 124. The sensor electrode layer 121 and the electrode base material 23 are arranged in such a manner that the principal surfaces of the sensor electrode layer 121 and the electrode base material 23 face each other. The elastic layer 123 is provided between the principal surfaces of the sensor electrode layer 121 and the electrode base material 23. The sensor electrode layer 121 and the electrode base material 122 are arranged in such a manner that the principal surfaces of the sensor electrode layer 121 and the electrode base material 122 face each other. The gap layer 124 is provided between the principal surfaces of the sensor electrode layer 121 and the electrode base material 122.

The sensor electrode layer 121, the electrode base material 122, and the gap layer 124 are respectively similar to the sensor electrode layer 21, the electrode base material 23, and the gap layer 25 in the second sensor 130. An elasticity degree of the elastic layer 123 in the thickness direction of the stack-type sensor 113 is smaller than an elasticity degree of the elastic layer 24 in the thickness direction of the stack-type sensor 113. Therefore, in a case where pressure is added in the thickness direction of the stack-type sensor 113, because the elastic layer 123 is crushed before the elastic layer 24 is crushed, the elastic layer 24 is prevented from being crushed. Accordingly, it is possible to enhance separability between shear force and pressure. Thus, it is possible to enhance detection accuracy of a shear force distribution of the stack-type sensor 113. The elastic layer 28 includes at least one type of foamed resin, an elastomer, woven cloth, or unwoven cloth, for example. As the foamed resin and the elastomer, foamed resin and an elastomer similar to those of the elastic layer 24 can be exemplified.

In a case where the gap layer 25 is an elastic layer configured to be elastically deformed by pressure added in the thickness direction of the stack-type sensor 113, it is preferable that an elasticity degree of the elastic layer 123 in the thickness direction of the stack-type sensor 113 is smaller than elasticity degrees of the elastic layer 24 and the gap layer 25 in the thickness direction of the stack-type sensor 113. Therefore, in a case where pressure is added in the thickness direction of the stack-type sensor 113, because the elastic layer 123 is crushed before the elastic layer 24 and the gap layer 25 are crushed, the elastic layer 24 and the gap layer 25 are prevented from being crushed. Accordingly, it is possible to enhance separability between shear force and pressure. Thus, it is possible to enhance detection accuracy of a pressure distribution and a shear force distribution of the stack-type sensor 113.

It is preferable that the elasticity degree of the elastic layer 123 in the in-plane direction of the stack-type sensor 113 is larger than an elasticity degree of the elastic layer 24 in the in-plane direction of the sensor 20. Therefore, in a case where shear force is added in the in-plane direction of the stack-type sensor 113, it is possible to prevent the elastic layer 123 from being elastically deformed in the in-plane direction of the stack-type sensor 113, before the elastic layer 24 is elastically deformed in the in-plane direction of the stack-type sensor 113. Accordingly, it is possible to suppress a decline in detection sensitivity of shear force.

Effect

Because the stack-type sensor 113 according to the second embodiment includes the first sensor 120, and the second sensor 130 provided on the first sensor 120, the stack-type sensor 113 can detect both a shear force distribution and a pressure distribution.

Because the stack-type sensor 113 can detect both a pressure distribution and a shear force distribution, by using the stack-type sensor 113 in a fingertip of a robot hand, or the like, for example, it becomes possible to cause the robot hand to execute a work of moving an object while gripping the object.

Because the stack-type sensor 113 can detect a shear distribution, in a case where the stack-type sensor 113 is applied to a robot hand, it is possible to cause the robot hand to execute a complicated work while feeding back a detection result of a shear force distribution.

The stack-type sensor 113 can also be used as a user interface device that can perform input by a natural operation. For example, it is possible to control an electronic device or the like by detecting a natural motion of a human not by a determined button but by a desired region.

Modified Example

In the second embodiment, the description has been given of a case where the first controller IC 114 and the second controller IC 115 are respectively provided for the first sensor 120 and the second sensor 130, but one controller may be provided for the first sensor 120 and the second sensor 130, and the first sensor 120 and the second sensor 130 may be controlled by the one controller IC. In this case, the controller IC may correct an output value of the second sensor 130 using an output value of the first sensor 120.

In the second embodiment, the description has been given of a case where the first sensor 120 is a mutual capacitive sensor similar to the second sensor 130, but the first sensor 120 may be a pressure sensor other than a mutual capacitive sensor. Nevertheless, from the viewpoint of simplification of a system, it is preferable that both the first sensor 120 and the second sensor 130 are mutual capacitive sensors as in the second embodiment.

In the second embodiment, the description has been given of an example in which the second sensor 130 serving as a shear force sensor is combined with the first sensor 120 serving as a pressure sensor, but artificial skin may be formed by combining the second sensor 130 with a temperature sensor, an acceleration sensor, or the like. Furthermore, artificial skin may be formed by combining the stack-type sensor 113 with a temperature sensor, an acceleration sensor, or the like.

Figure 18:
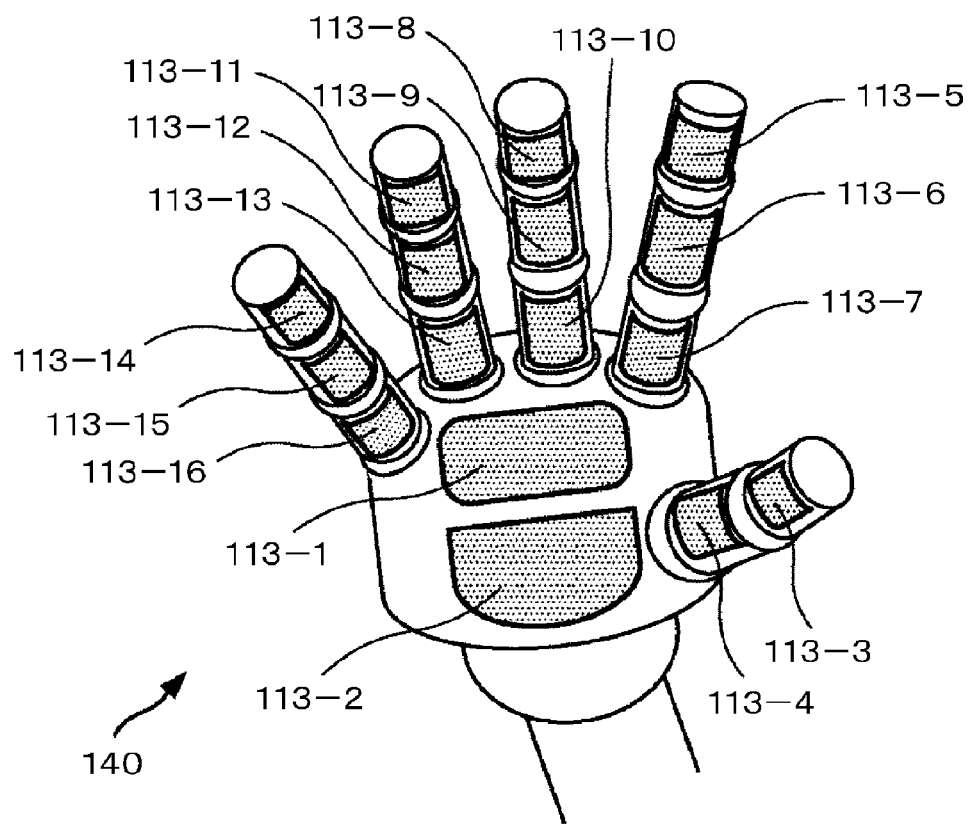
FIG. 18 is a schematic diagram illustrating a configuration of a robot hand to which a stack-type sensor is applied.

The stack-type sensor 113 may be applied to a robot hand. FIG. 18 illustrates a configuration of a robot hand 140 to which the stack-type sensor 113 is applied. A palm forming the robot hand 140 is provided with sensors 113-1 and 113-2, a sensor 113-3 is provided in an upper part on a palmar surface of a first joint of a thumb forming the robot hand 140, a sensor 113-4 is provided between the first joint and a second joint, a sensor 113-5 is provided in an upper part on the palmar surface of a first joint of a forefinger, a sensor 113-6 is provided between the first joint and a second joint, and a sensor 113-7 is provided between the second joint and a third joint.

Moreover, a sensor 113-8 is provided in an upper part on the palmar surface of a first joint of a middle finger, a sensor 113-9 is provided between the first joint and a second joint, a sensor 113-10 is provided between the second joint and a third joint, a sensor 113-11 is provided in an upper part on the palmar surface of a first joint of an annular finger, a sensor 113-12 is provided between the first joint and a second joint, a sensor 113-13 is provided between the second joint and a third joint, a sensor 113-14 is provided in an upper part on the palmar surface of a first joint of a little finger, a sensor 113-15 is provided between the first joint and a second joint, and a sensor 113-16 is provided between the second joint and a third joint. As the sensors 113-1 to 113-16, the sensor 113 according to the second embodiment is used.

Heretofore, the first and second embodiments of the present disclosure, and modified examples thereof have been specifically described, but the present disclosure is not limited to the above-described first and second embodiments and modified examples thereof. Various modifications can be made on the basis of the technical idea of the present disclosure.

The configurations, methods, processes, shapes, materials, numerical values, and the like that have been described in the above-described first and second embodiments and modified examples thereof are merely examples, and configurations, methods, processes, shapes, materials, numerical values, and the like that are different from these may be used as necessary.

The configurations, methods, processes, shapes, materials, numerical values, and the like in the above-described first and second embodiments and modified examples thereof can be combined with each other without departing from the gist of the present disclosure.

Furthermore, the present disclosure can also employ the following configuration.

(1) A sensor including:
a sensor electrode layer including a capacitive sensing unit;
a first reference electrode layer provided to face a first surface of the sensor electrode layer; and
a first elastic layer that is provided between the first reference electrode layer and the sensor electrode layer, and is configured to be elastically deformed by shear force added in an in-plane direction,
in which at least one of the first reference electrode layer or the first elastic layer includes a first probe portion that is displaced in an in-plane direction in accordance with elastic deformation of the first elastic layer, and changes an electrostatic capacitance of the sensing unit.

(2) The sensor according to (1),
in which the first reference electrode layer includes a protruding portion or a recess facing the first surface, and
the first probe portion is the protruding portion or the recess.

(3) The sensor according to (2), in which the sensing unit is provided in a portion facing a peripheral portion of the protruding portion or the recess.

(4) The sensor according to any of (1) to (3),
in which the first elastic layer includes a first portion having a first permittivity, and a second portion having a second permittivity different from the first permittivity, in an in-plane direction, and
the first probe portion is the second portion.

(5) The sensor according to (4), in which the first portion faces the sensing unit.

(6) The sensor according to any of (1) to (5), in which the first probe portion and the sensing unit have a spiral shape.

(7) The sensor according to any of (1) to (5),
in which the sensor electrode layer includes a plurality of the sensing units, and
a plurality of the sensing units is provided to surround a facing portion of the sensor electrode layer that faces the first probe portion.

(8) The sensor according to any of (1) to (5),
in which the sensor electrode layer includes a plurality of the sensing units,
at least one of the first reference electrode layer or the first elastic layer includes a plurality of the first probe portions, and
a plurality of the sensing units is provided to surround each facing portion of the sensor electrode layer that faces a corresponding one of a plurality of the first probe portions.

(9) The sensor according to (7) or (8), further including a calculation unit configured to calculate a direction and a magnitude of shear force added in an in-plane direction, on the basis of a change in electrostatic capacitance of a plurality of the sensing units.

(10) The sensor according to any of (1) to (9), in which the first reference electrode layer has a stretching property.

(11) The sensor according to any of (1) to (10), in which an elasticity degree of the first elastic layer in an in-plane direction is smaller than an elasticity degree of the first elastic layer in a thickness direction.

(12) The sensor according to any of (1) to (11), further including:
a second reference electrode layer provided to face a second surface of the sensor electrode layer; and
a gap layer provided between the second reference electrode layer and the sensor electrode layer.

(13) The sensor according to (12),
in which the gap layer is an elastic layer configured to be elastically deformed by shear force added in an in-plane direction, and
at least one of the second reference electrode layer or the gap layer includes a second probe portion that is displaced in an in-plane direction in accordance with elastic deformation of the gap layer, and changes an electrostatic capacitance of the sensing unit.

(14) The sensor according to (13), in which the sensor electrode layer has a stretching property.

(15) The sensor according to any of (12) to (14), further including a second elastic layer provided on a surface on an opposite side of the sensor electrode layer side out of both surfaces of the second reference electrode layer,
in which an elasticity degree of the second elastic layer in a thickness direction is smaller than an elasticity degree of the first elastic layer in the thickness direction.

(16) A stack-type sensor including:
a first sensor configured to detect pressure; and
a second sensor that is provided on the first sensor, and is configured to detect shear force,
in which the second sensor is the sensor according to any of (1) to (15).

(17) The stack-type sensor according to (16),
in which the first sensor includes a third elastic layer, and an elasticity degree of the third elastic layer in a thickness direction is smaller than an elasticity degree of the first elastic layer in the thickness direction.

(18) An electronic device including: the sensor according to any of (1) to (17).

REFERENCE SIGNS LIST 10, 110 Electronic device
11, 111 Sensor module
12 Host device
13 Controller IC (calculation unit)
20 Sensor
20A Connection portion
20B Connection terminal
20EM Sensor element
20 SE Sensing unit
21, 121 Sensor electrode layer
21A, 22A, 23A Base material
21B Protective layer
21C Pulse electrode (first electrode)
21D Sense electrode (second electrode)
21$C_1$, 21$D_1$ Sub electrode
22, 23, 122 Electrode base material
22B Reference electrode layer (first reference electrode)
23B Reference electrode layer (second reference electrode)
22C, 22D Protruding portion
22E Recess
24 Elastic layer (first elastic layer)
25, 124 Gap layer
26A, 26B, 27A, 27B Adhesion layer
28 Elastic layer (second elastic layer)
113 Stack-type sensor
114 First controller IC
115 Second controller IC
120 First sensor
123 Elastic layer (third elastic layer)
130 Second sensor
140 Robot hand
L Electric force line

The invention claimed is:

1. A sensor comprising:
a sensor electrode layer including a capacitive sensing unit;
a first reference electrode layer provided to face a first surface of the sensor electrode layer; and
a first elastic layer that is provided between the first reference electrode layer and the sensor electrode layer, and is configured to be elastically deformed by shear force added in an in-plane direction,
wherein at least one of the first reference electrode layer or the first elastic layer includes a first probe portion that is displaced in an in-plane direction in accordance with elastic deformation of the first elastic layer, and changes an electrostatic capacitance of the sensing unit, and
wherein an elasticity degree of the first elastic layer in an in-plane direction is smaller than an elasticity degree of the first elastic layer in a thickness direction.

2. The sensor according to claim 1,
wherein the first reference electrode layer includes a protruding portion or a recess facing the first surface, and the first probe portion is the protruding portion or the recess.

3. The sensor according to claim 2, wherein the sensing unit is provided in a portion facing a peripheral portion of the protruding portion or the recess.

4. The sensor according to claim 1,
wherein the first elastic layer includes a first portion having a first permittivity, and a second portion having a second permittivity different from the first permittivity, in an in-plane direction, and
the first probe portion is the second portion.

5. The sensor according to claim 4, wherein the first portion faces the sensing unit.

6. The sensor according to claim 1, wherein the first probe portion and the sensing unit have a spiral shape.

7. The sensor according to claim 1,
wherein the sensor electrode layer includes a plurality of the sensing units, and
a plurality of the sensing units is provided to surround a facing portion of the sensor electrode layer that faces the first probe portion.

8. The sensor according to claim 7, further comprising a calculation unit configured to calculate a direction and a magnitude of shear force added in an in-plane direction, on a basis of a change in electrostatic capacitance of a plurality of the sensing units.

9. The sensor according to claim 1,
wherein the sensor electrode layer includes a plurality of the sensing units,
at least one of the first reference electrode layer or the first elastic layer includes a plurality of the first probe portions, and
a plurality of the sensing units is provided to surround each facing portion of the sensor electrode layer that faces a corresponding one of a plurality of the first probe portions.

10. The sensor according to claim 1, wherein the first reference electrode layer has a stretching property.

11. A stack-type sensor comprising:
a first sensor configured to detect pressure; and
the sensor according to claim 1, which is configured to detect shear force, is provided on the first sensor.

12. The stack-type sensor according to claim 11,
wherein the first sensor includes a third elastic layer, and an elasticity degree of the third elastic layer in a thickness direction is smaller than an elasticity degree of the first elastic layer in the thickness direction.

13. An electronic device comprising the sensor according to claim 1.

14. A sensor comprising:
a sensor electrode layer including a capacitive sensing unit;
a first reference electrode layer provided to face a first surface of the sensor electrode layer; and
a first elastic layer that is provided between the first reference electrode layer and the sensor electrode layer, and is configured to be elastically deformed by shear force added in an in-plane direction,
wherein at least one of the first reference electrode layer or the first elastic layer includes a first probe portion that is displaced in an in-plane direction in accordance with elastic deformation of the first elastic layer, and changes an electrostatic capacitance of the sensing unit;
a second reference electrode layer provided to face a second surface of the sensor electrode layer; and
a gap layer provided between the second reference electrode layer and the sensor electrode layer.

15. The sensor according to claim 14,
wherein the gap layer is an elastic layer configured to be elastically deformed by shear force added in an in-plane direction, and
at least one of the second reference electrode layer or the gap layer includes a second probe portion that is displaced in an in-plane direction in accordance with elastic deformation of the gap layer, and changes an electrostatic capacitance of the sensing unit.

16. The sensor according to claim 15, wherein the sensor electrode layer has a stretching property.

17. The sensor according to claim 14, further comprising a second elastic layer provided on a surface on an opposite side of the sensor electrode layer side out of both surfaces of the second reference electrode layer,
wherein an elasticity degree of the second elastic layer in a thickness direction is smaller than an elasticity degree of the first elastic layer in the thickness direction.

18. A sensor comprising:
a sensor electrode layer including a capacitive sensing unit;
a first reference electrode layer provided to face a first surface of the sensor electrode layer; and
a first elastic layer that is provided between the first reference electrode layer and the sensor electrode layer, and is configured to be elastically deformed by shear force added in an in-plane direction,
wherein
at least one of the first reference electrode layer or the first elastic layer includes a first probe portion that is displaced in an in-plane direction in accordance with elastic deformation of the first elastic layer, and changes an electrostatic capacitance of the sensing unit,
the first elastic layer includes a first portion having a first permittivity, and a second portion having a second permittivity different from the first permittivity, in an in-plane direction, and
the first probe portion is the second portion.

19. The sensor according to claim 18, wherein the first portion faces the sensing unit.

20. An electronic device comprising the sensor according to claim 18.

* * * * *